United States Patent
Okada et al.

(10) Patent No.: US 10,514,594 B2
(45) Date of Patent: Dec. 24, 2019

(54) PROJECTOR

(71) Applicant: SEIKO EPSON CORPORATION, Tokyo (JP)

(72) Inventors: Naoya Okada, Shiojiri (JP); Nobuo Sugiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/288,875

(22) Filed: Feb. 28, 2019

(65) Prior Publication Data

US 2019/0271906 A1 Sep. 5, 2019

(30) Foreign Application Priority Data

Mar. 1, 2018 (JP) .................. 2018-036219

(51) Int. Cl.
*G03B 21/16* (2006.01)
*H04N 9/31* (2006.01)

(52) U.S. Cl.
CPC ........... *G03B 21/16* (2013.01); *H04N 9/3105* (2013.01); *H04N 9/315* (2013.01); *H04N 9/3144* (2013.01)

(58) Field of Classification Search
CPC ............................. G03B 21/16; H04N 9/3144
USPC ................................ 353/54, 52; 361/679.53
See application file for complete search history.

(56) References Cited

U.S. PATENT DOCUMENTS

| 8,517,540 B2 | 8/2013 | Terao |
| 2002/0191159 A1 | 12/2002 | Nagao et al. |
| 2011/0037954 A1* | 2/2011 | Tsuchiya ............... G03B 21/16 353/54 |
| 2011/0242499 A1 | 10/2011 | Terao |

FOREIGN PATENT DOCUMENTS

| JP | 2002-107698 A | 4/2002 |
| JP | 2002-115868 A | 4/2002 |
| JP | 2002-224530 A | 8/2002 |
| JP | 2002-372748 A | 12/2002 |
| JP | 2007-294655 A | 11/2007 |
| JP | 2010-107751 A | 5/2010 |
| JP | 2011-215457 A | 10/2011 |
| JP | 2013-198861 A | 10/2013 |
| JP | 2015-33937 A | 2/2015 |

\* cited by examiner

*Primary Examiner* — Ryan D Howard
(74) *Attorney, Agent, or Firm* — Oliff PLC

(57) ABSTRACT

A projector includes a cooler that cools a cooling target based on transformation of a refrigerant into a gas. The cooler includes a refrigerant generator that generates the refrigerant, a refrigerant sender that sends the refrigerant generated in the refrigerant generator toward the cooling target, and a refrigerant holder connected to the cooling target, the refrigerant holder holding the refrigerant sent by the refrigerant sender and receiving heat from the cooling target to transform the refrigerant into a gas. The refrigerant generator includes a heat exchanger that stores the generated refrigerant therein. In a case where the projector takes a basic attitude, the refrigerant holder and the refrigerant generator are so located in the projector that the surface of the refrigerant stored in the heat exchanger is lower in the gravity direction than the horizontal plane passing through the lowest portion of the refrigerant holder in the gravity direction.

9 Claims, 20 Drawing Sheets

PROJECTOR

BACKGROUND

1. Technical Field

The present invention relates to a projector.

2. Related Art

To cool a projector, there is, for example, a proposed air-cooling cooler using an air blower (see JP-A-2002-107698, for example) and a liquid-cooling cooler using a pump that delivers a refrigerant liquid and a pipe through which the refrigerant liquid passes (see JP-A-2007-294655, for example).

In recent years, increase in luminance of light outputted from a projector and other factors increase the amount of heat produced by a cooling target to be cooled by a cooler, and improvement in the cooling performance of the cooler is therefore required. To improve the cooling performance of the cooler using, for example, air-cooling or liquid-cooling described above, however, the cooler is enlarged, resulting in a problem of an increase in the size of the projector. Further, in the case of the air-cooling, there is also a problem of an increase in noise produced by the air blower.

SUMMARY

An advantage of some aspects of the invention is to provide a projector including a cooler that not only excels in cooling performance but is compact and excels in quietness.

A projector according to this application example includes a light source apparatus that emit light, a light modulator that modulates the light emitted from the light source apparatus in accordance with an image signal, a projection optical apparatus that projects the light modulated by the light modulator, and a cooler that cools a cooling target based on transformation of a refrigerant into a gas. The cooler includes a refrigerant generator that generates the refrigerant, a refrigerant sender that sends the refrigerant generated in the refrigerant generator toward the cooling target, and a refrigerant holder connected to the cooling target, the refrigerant holder holding the refrigerant sent by the refrigerant sender, and receiving heat from the cooling target to transform the refrigerant into a gas. The refrigerant generator includes a storage that stores the generated refrigerant therein. In a case where the projector takes a first attitude, the refrigerant holder and the refrigerant generator are so located in the projector that a surface of the refrigerant stored in the storage is lower in a gravity direction than a lowest portion of the refrigerant holder in the gravity direction.

According to this application example, the cooler is so configured that the refrigerant sender sends the refrigerant generated by the refrigerant generator to the cooling target and transformation of the refrigerant into a gas, which is an endothermic reaction, can be used to draw heat from the cooling target to cool the cooling target. The cooling based on the transformation of the refrigerant into a gas can actively draw heat from the cooling target and therefore has excellent cooling performance as compared with air cooling and liquid cooling, in which the cooling target is cooled based merely on heat transfer to a refrigerant. Therefore, to provide the same cooling performance as that provided by air cooling or liquid cooling, the overall size of the cooler is readily reduced as compared with the size required by air cooling or liquid cooling.

Further, in the cooling based on the transformation of the refrigerant into a gas, the cooling performance can be improved by an increase in the surface area where the refrigerant that is transformed into a gas comes into contact with the cooling target. Increasing the cooling performance of the cooler therefore does not cause an increase in noise. According to this application example, the projector can therefore be configured to include the cooler that not only excels in cooling performance but has a compact size and excels in quietness.

Further, according to this application example, in which the refrigerant generator can generate the refrigerant, a user's convenience can be improved because the user does not need to replenish the refrigerant.

In an aspect of the projector according to the invention, forming a groove or using a porous member in the refrigerant sender always allows an appropriate amount of refrigerant to be sent with no use of a pump or any other power source, whereby the size, weight, cost, and noise of the projector are readily reduced.

According to this application example, in which the surface of the refrigerant generated by the refrigerant generator and stored in the storage is lower in the gravity direction than the lowest portion of the refrigerant holder in the gravity direction, no excessive refrigerant is sent by gravity to the refrigerant holder, whereby leakage of the refrigerant from the refrigerant holder can be avoided.

In the projector according to the application example described above, it is desirable that the refrigerant holder and the refrigerant generator are so located in the projector that the surface of the refrigerant stored in the storage is lower in the gravity direction than the lowest portion of the refrigerant holder in the gravity direction both in the first attitude and a second attitude that the projector taking the first attitude is rotated by 90° around a first horizontal axis.

According to this application example, in which the surface of the refrigerant generated by the refrigerant generator and stored in the storage is lower in the gravity direction than the lowest portion of the refrigerant holder in the gravity direction both in the first attitude and the second attitude, no excessive refrigerant is sent by gravity to the refrigerant holder, whereby leakage of the refrigerant from the refrigerant holder can be avoided.

In the projector according to the application example described above, it is desirable that the refrigerant holder and the refrigerant generator are so located in the projector that the surface of the refrigerant stored in the storage is lower in the gravity direction than the lowest portion of the refrigerant holder in the gravity direction both in the first attitude and a second attitude that the projector taking the first attitude is rotated by 180° around a first horizontal axis.

According to this application example, in which the surface of the refrigerant generated by the refrigerant generator and stored in the storage is lower in the gravity direction than the lowest portion of the refrigerant holder in the gravity direction both in the first attitude and the third attitude, no excessive refrigerant is sent by gravity to the refrigerant holder, whereby leakage of the refrigerant from the refrigerant holder can be avoided.

In the projector according to the application example described above, it is desirable that the refrigerant holder and the refrigerant generator are so located in the projector that the surface of the refrigerant stored in the storage is lower in the gravity direction than the lowest portion of the refrigerant holder in the gravity direction in the first attitude, a second attitude that the projector taking the first attitude is rotated by 90° around a first horizontal axis along a first rotational direction, a third attitude that the projector taking the second attitude is further rotated by 90° around the first horizontal axis along the first rotational direction, and a fourth attitude that the projector taking the third attitude is further rotated by 90° around the first horizontal axis along the first rotational direction.

According to this application example, in which the surface of the refrigerant generated by the refrigerant generator and stored in the storage is lower in the gravity direction than the lowest portion of the refrigerant holder in the gravity direction in any of the first to fourth attitude, no excessive refrigerant is sent by gravity to the refrigerant holder, whereby leakage of the refrigerant from the refrigerant holder can be avoided.

In the projector according to the application example described above, it is desirable that the refrigerant holder and the refrigerant generator are so located in the projector that the surface of the refrigerant stored in the storage is lower in the gravity direction than the lowest portion of the refrigerant holder in the gravity direction in a fifth attitude that the projector taking the first attitude is rotated by 90° around a second horizontal axis orthogonal to the first horizontal axis.

According to this application example, in which the surface of the refrigerant generated by the refrigerant generator and stored in the storage is lower in the gravity direction than the lowest portion of the refrigerant holder in the gravity direction also in the fifth attitude, no excessive refrigerant is sent by gravity to the refrigerant holder, whereby leakage of the refrigerant from the refrigerant holder can be avoided.

In the projector according to the application example described above, it is desirable that the refrigerant holder and the refrigerant generator are so located in the projector that when the storage and the refrigerant holder are projected on a first plane perpendicular to the first horizontal axis, the storage extends off the refrigerant holder on both positive and negative sides in a first direction parallel to the first plane and on both positive and negative sides in a second direction parallel to the first plane and orthogonal to the first direction.

According to this application example, even in a case where any of the positive/negative sides in the first direction and the positive/negative sides in the second direction is shifted toward the lower side in the gravity direction, the refrigerant stored in the storage can be lower in the gravity direction than the refrigerant holder.

In the projector according to the application example described above, it is desirable that a groove that causes surface tension to occur is formed in an inner wall of the storage, and that the refrigerant sender includes the groove.

According to this application example, the refrigerant can be sent from the storage of the refrigerant generator by using a simple structure.

In the projector according to the application example described above, it is desirable that an inner wall of the storage is provided with a porous member, and that the refrigerant sender includes the porous member.

According to this application example, the refrigerant can be sent from the storage of the refrigerant generator by using a simple structure.

In the projector according to the application example described above, it is desirable that the cooling target is the light modulator.

According to this application example, since the temperature of the light modulator can be lowered, degradation in the performance of the projector due to heat from the light modulator can be suppressed, whereby the life of the projector can be prolonged.

BRIEF DESCRIPTION OF THE DRAWINGS

The invention will be described with reference to the accompanying drawings, wherein like numbers reference like elements.

DESCRIPTION OF EXEMPLARY EMBODIMENTS

Projectors according to embodiments of the invention will be described below with reference to the drawings. The scope of the invention is not limited to the following embodiments and can be arbitrarily changed within the scope of the technical idea of the invention. In the following drawings, for clarity of each configuration, the scale, the number, and other factors of the structure of the configuration differ from the scale, the number, and the other factors of an actual structure of the configuration in some cases.

First Embodiment

Figure 1:
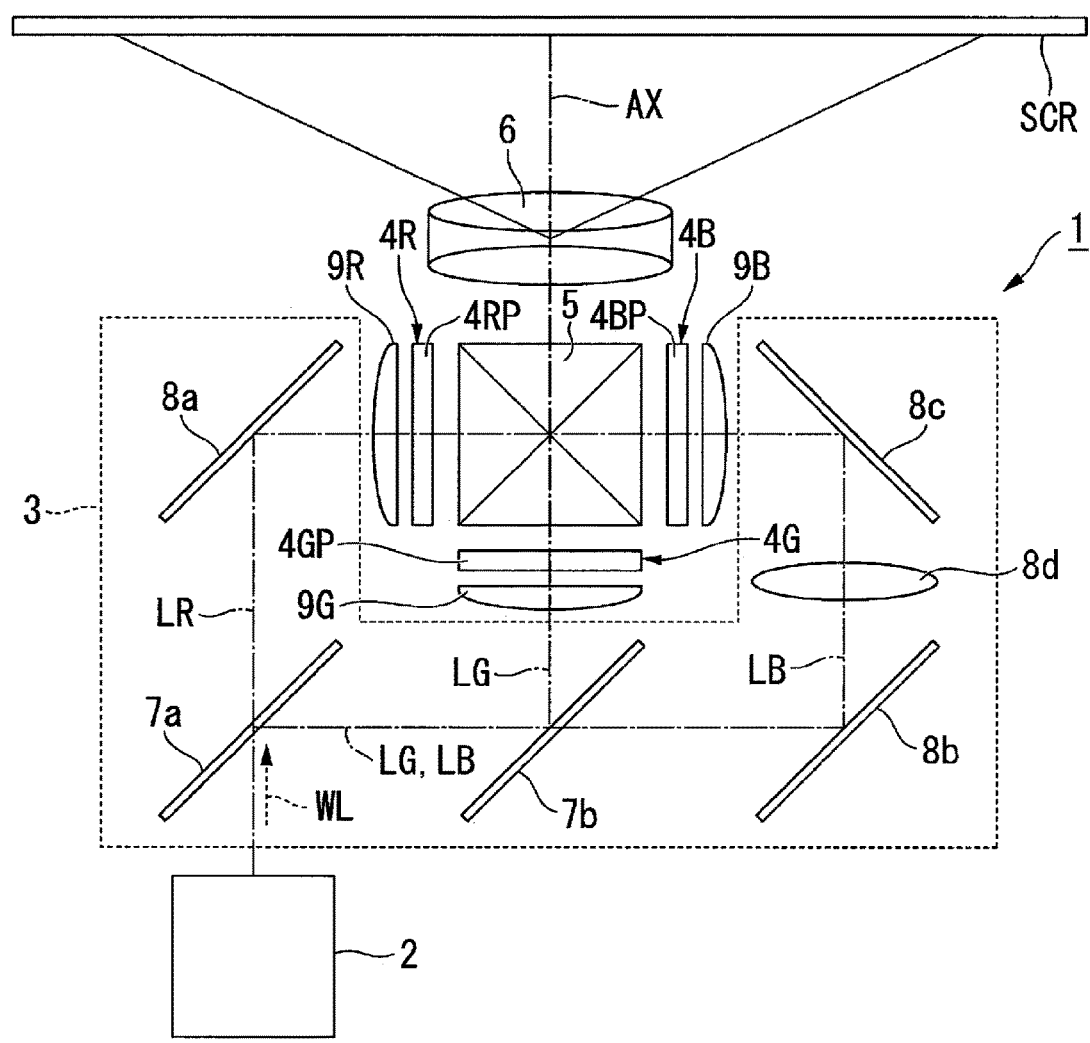
FIG. 1 is a schematic configuration diagram showing a projector according to a first embodiment.
Figure 2:
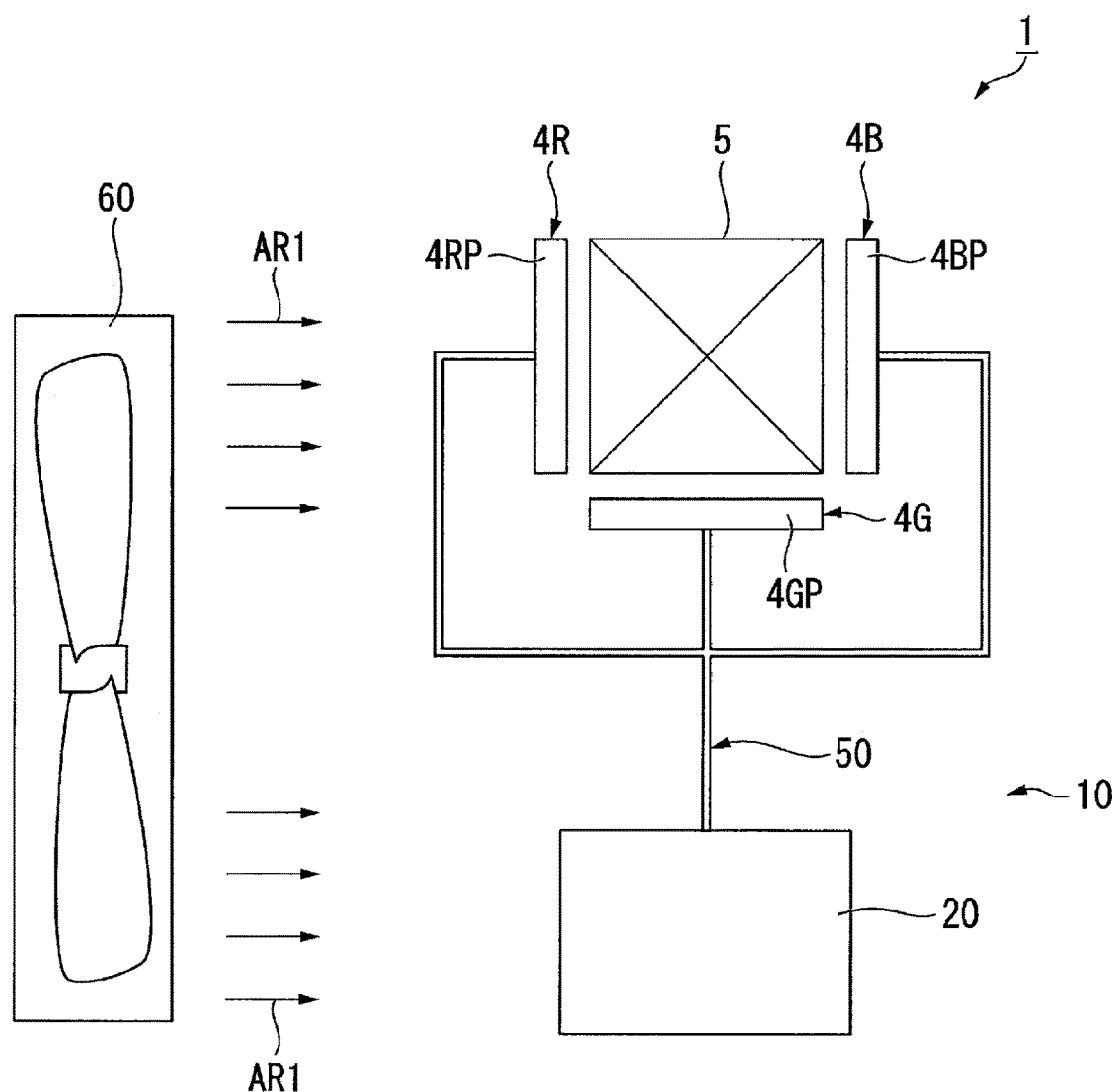
FIG. 2 is a diagrammatic view showing part of the projector according to the first embodiment.

FIG. 1 is a schematic configuration diagram showing a projector 1 according to the present embodiment. FIG. 2 is a diagrammatic view showing part of the projector 1 according to the present embodiment. The projector 1 includes a light source apparatus 2, a color separation system 3, light modulation units 4R, 4G, and 4B, a light combining system 5, and a projection optical apparatus 6, as shown in FIG. 1. The light modulation unit 4R includes a light modulator 4RP. The light modulation unit 4G includes a light modulator 4GP. The light modulation unit 4B includes a light modulator 4BP. The attitude of the projector 1 in FIG. 1 is the attitude taken when the projector 1 projects a horizontally elongated image on a screen SCR and corresponds to the basic attitude described later.

The light source apparatus 2 outputs illumination light WL, which is so adjusted as to have a roughly uniform illuminance distribution, toward the color separation system 3. The light source apparatus 2 includes, for example, a semiconductor laser as a light source. The color separation system 3 separates the illumination light WL from the light source apparatus 2 into red light LR, green light LG, and blue light LB. The color separation system 3 includes a first dichroic mirror 7a, a second dichroic mirror 7b, a first reflection mirror 8a, a second reflection mirror 8b, a third reflection mirror 8c, and a relay lens 8d.

The first dichroic mirror 7a separates the illumination light WL outputted from the light source apparatus 2 into the red light LR and light containing the green light LG and the blue light LB mixed with each other. The first dichroic mirror 7a transmits the red light LR and reflects the green light LG and the blue light LB. The second dichroic mirror 7b separates the light containing the green light LG and the blue light LB mixed with each other into the green light LG and the blue light LB. The second dichroic mirror 7b reflects the green light LG and transmits the blue light LB.

The first reflection mirror 8a is disposed in the light path of the red light LR and reflects the red light LR having passed through the first dichroic mirror 7a toward the light modulator 4RP. The second reflection mirror 8b and the third reflection mirror 8c are disposed in the light path of the blue light LB and guide the blue light LB having passed through the second dichroic mirror 7b to the light modulator 4BP.

The light modulators 4RP, 4GP, and 4BP are each formed of a liquid crystal panel. The light modulator 4RP modulates the red light LR out of the light from the light source apparatus 2 in accordance with an image signal. The light modulator 4GP modulates the green light LG out of the light from the light source apparatus 2 in accordance with an image signal. The light modulator 4BP modulates the blue light LB out of the light from the light source apparatus 2 in accordance with an image signal. The light modulators 4RP, 4GP, and 4BP thus form image light fluxes corresponding to the respective color light fluxes. Although not shown, polarizers are disposed on the light incident side and the light exiting side of each of the light modulators 4RP, 4GP, and 4BP.

A field lens 9R, which parallelizes the red light LR to be incident on the light modulator 4RP, is disposed on the light incident side of the light modulator 4RP. A field lens 9G, which parallelizes the green light LG to be incident on the light modulator 4GP, is disposed on the light incident side of the light modulator 4GP. A field lens 9B, which parallelizes the blue light LB to be incident on the light modulator 4BP, is disposed on the light incident side of the light modulator 4BP.

The light combining system 5 is formed of a cross dichroic prism having a roughly cubic shape. The light combining system 5 combines the color image light fluxes from the light modulators 4RP, 4GP, and 4BP with one another. The light combining system 5 outputs the combined image light toward the projection optical apparatus 6. The projection optical apparatus 6 is formed of a group of projection lenses. The projection optical apparatus 6 enlarges the combined image light from the light combining system 5, that is, the light fluxes modulated by the light modulators 4RP, 4GP, and 4BP and projects the enlarged image light toward the screen SCR. An enlarged color image (video images) is thus displayed on the screen SCR.

The projector 1 further includes a cooler 10, as shown in FIG. 2. The cooler 10, in which a refrigerant W (see FIG. 3) is transformed into a gas, cools a cooling target provided in the projector 1. In the present embodiment, the refrigerant W is, for example, liquid water. In the following description, the transformation of the refrigerant W into a gas is therefore simply called vaporization in some cases. In the present embodiment, the cooling target includes the light modulation units 4R, 4G, and 4B.

The cooler 10 includes a refrigerant generator 20 and a refrigerant sender 50. The refrigerant generator 20 is a portion that generates the refrigerant W. The refrigerant sender 50 is a portion that sends the generated refrigerant W toward the cooling target. The refrigerant W delivered by the refrigerant sender 50 to the cooling target (light modulation units 4R, 4G, and 4B in the present embodiment) vaporizes so as to be capable of drawing heat from the cooling target, whereby the cooler 10 can cool the cooling target. The refrigerant generator 20 and the refrigerant sender 50 will be described below in detail.

Figure 3:
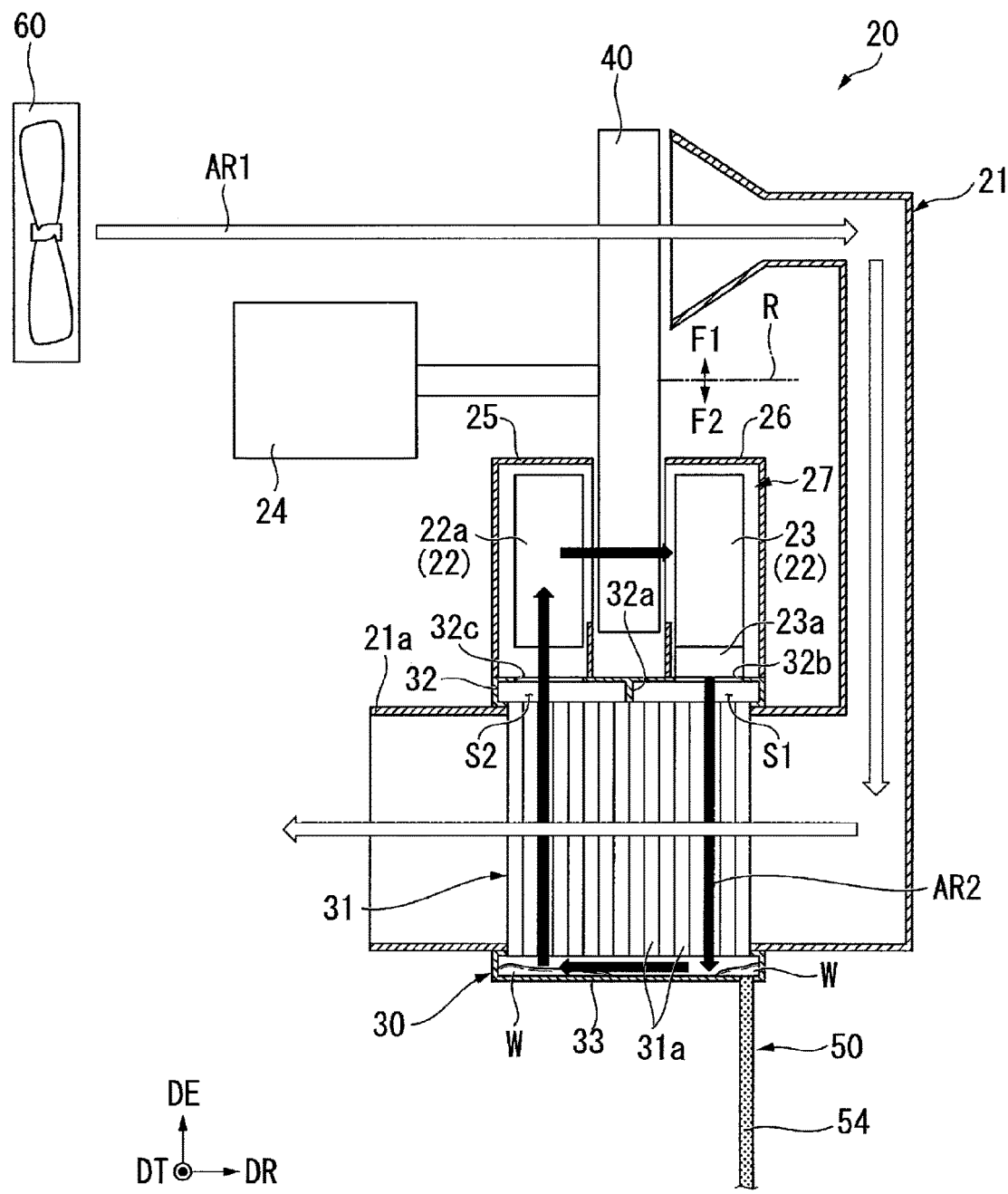
FIG. 3 is a schematic configuration diagram diagrammatically showing a refrigerant generator in the first embodiment.

FIG. 3 is a schematic configuration diagram diagrammatically showing the refrigerant generator 20 in the present embodiment. The refrigerant generator 20 includes a moisture absorbing/discharging member 40, a motor 24, a first air blower 60, a heat exchanger 30, a circulation duct 25, a circulation duct 26, a heater 22, and a cooling duct 21, as shown in FIG. 3.

Figure 4:
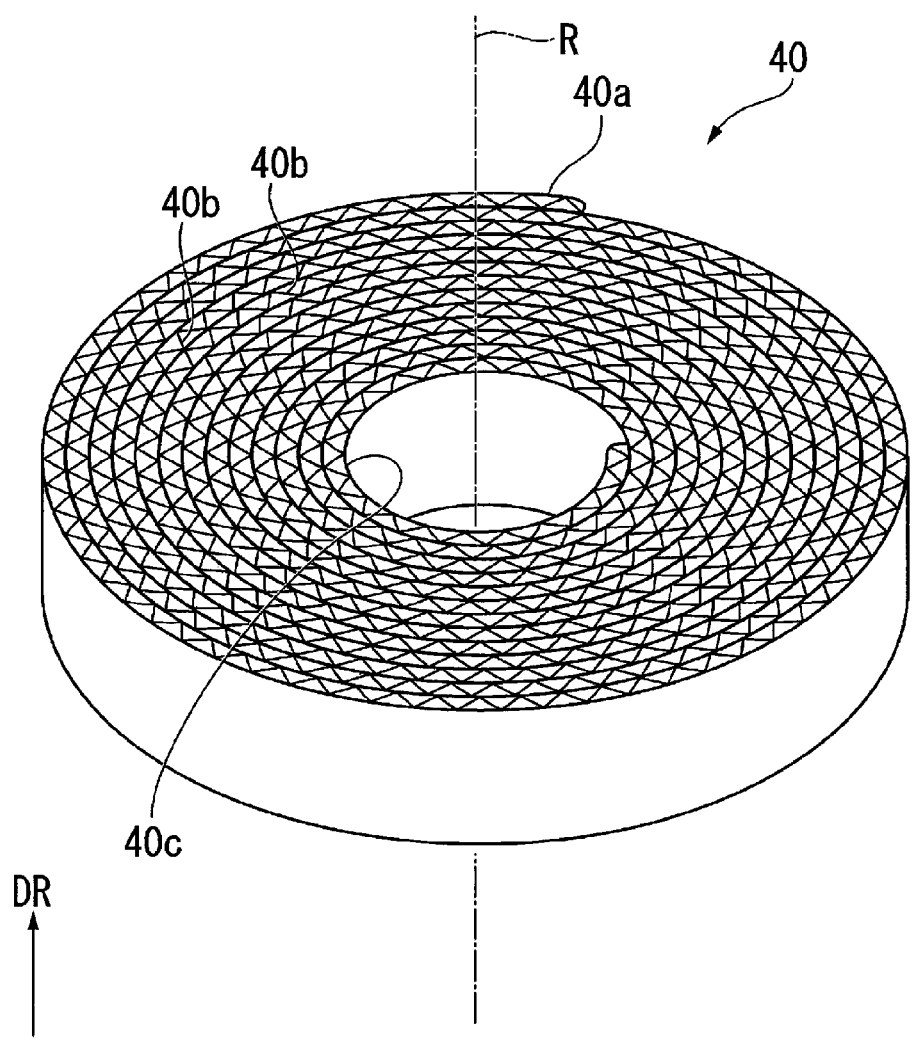
FIG. 4 is a perspective view of a moisture absorbing/discharging member in the first embodiment.

FIG. 4 is a perspective view showing the moisture absorbing/discharging member 40. The moisture absorbing/discharging member 40 has a flat cylindrical shape around an axis of rotation R, as shown in FIG. 4. A central hole 40c around the axis of rotation R is formed at the center of the moisture absorbing/discharging member 40. The central hole 40c passes through the moisture absorbing/discharging member 40 in the axial direction of the axis of rotation R. The moisture absorbing/discharging member 40 rotates around the axis of rotation R. In the following description, the axial direction of the axis of rotation R is called a "rotational axis direction DR" and drawn as appropriate in the form of an axis DR.

The moisture absorbing/discharging member 40 has an innumerable number of through holes 40b, which pass through the moisture absorbing/discharging member 40 in the rotational axis direction DR. The moisture absorbing/discharging member 40 is a porous member. The moisture absorbing/discharging member 40 absorbs and discharges moisture. In the present embodiment, the moisture absorbing/discharging member 40 is formed, for example, by winding a band-shaped member 40a having the through holes 40b around the axis of rotation R and applying a substance that absorbs and discharges moisture onto a surface of the wound band-shaped member 40a that is the surface exposed to the ambient environment. The surface of the wound band-shaped member 40a that is the surface exposed to the ambient environment includes the outer surface of the moisture absorbing/discharging member 40, the inner circumferential surface of the central hole 40c, and the inner surface of each of the through holes 40b. The moisture absorbing/discharging member 40 may instead be entirely made of a substance that absorbs and discharges moisture. An example of the substance that absorbs and discharges moisture may include zeolite.

The output shaft of the motor 24 shown in FIG. 3 is inserted into the central hole 40c of the moisture absorbing/discharging member 40 and fixed thereto. The motor 24 rotates the moisture absorbing/discharging member 40 around the axis of rotation R. The rotational speed of the moisture absorbing/discharging member 40 rotated by the motor 24 is, for example, approximately greater than or equal to 1 rpm but smaller than or equal to 5 rpm.

The first air blower 60 is, for example, an intake fan that takes outside air into the projector 1. The first air blower 60 delivers air AR1 to a portion of the moisture absorbing/discharging member 40 that is the portion located in a first region F1. The first region F1 is a region on one side of the axis of rotation R (upper side in FIG. 3) in the direction orthogonal to the axis of rotation R. On the other hand, the region on the other side of the axis of rotation R (lower side in FIG. 3) in the direction orthogonal to the axis of rotation R, that is, the region opposite the first region F1 is a second region F2.

The first air blower 60 delivers the air AR1 also to the light modulation units 4R, 4G, and 4B, which are each the cooling target, as shown in FIG. 2. The first air blower 60 is not limited to a specific apparatus and may be any apparatus capable of delivering the air AR1, for example, an axial fan and a centrifugal fan.

Figure 5:
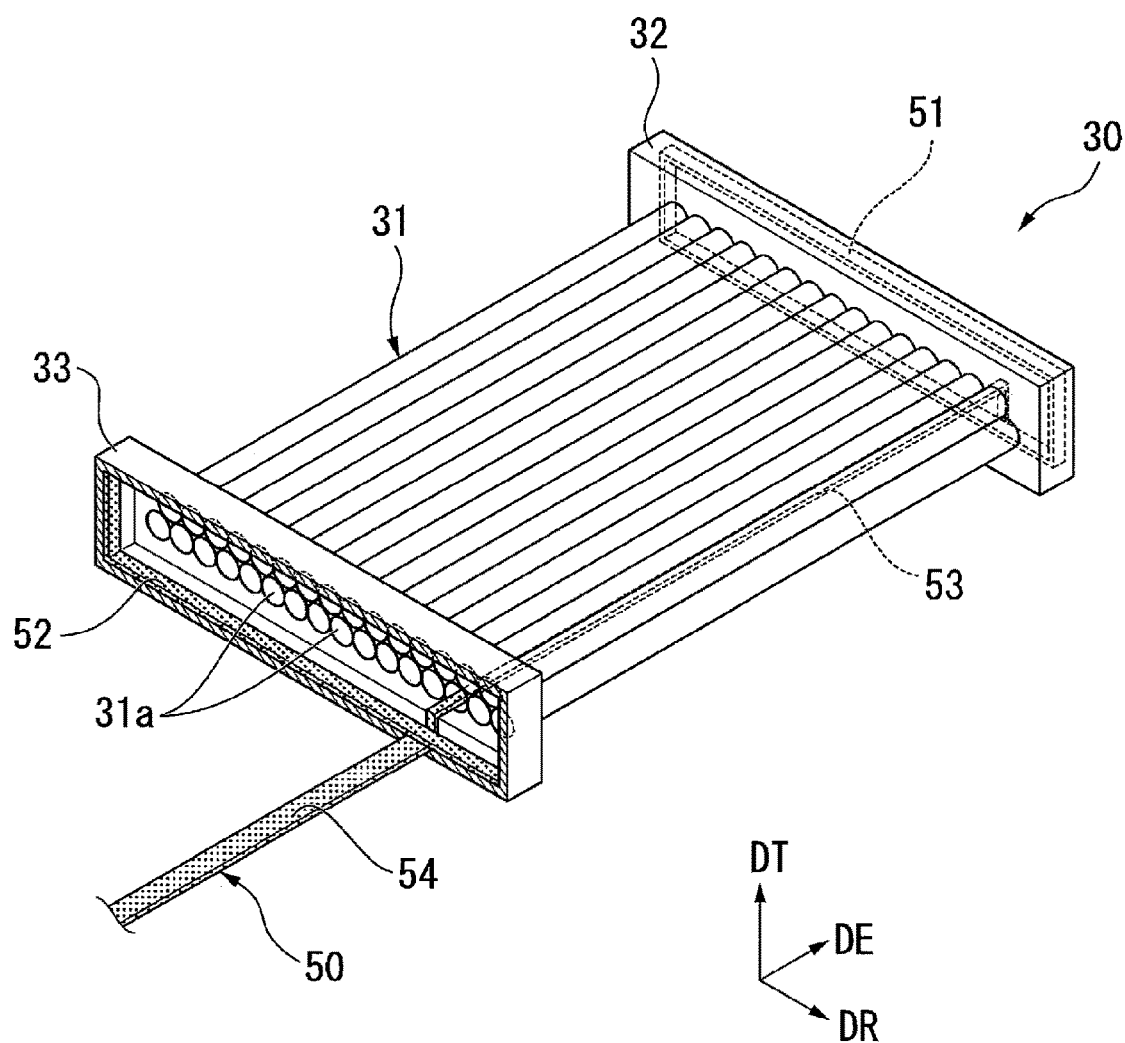
FIG. 5 is a partial cross-sectional perspective view showing a heat exchanger in the first embodiment.

The heat exchanger 30 is a portion that generates the refrigerant W. FIG. 5 is a partial cross-sectional perspective view showing the heat exchanger 30. The heat exchanger 30 includes a flow passage section 31, a first lid 32, and a second lid 33, as shown in FIG. 5.

The flow passage section 31 includes a plurality of pipes 31a, which each have a tubular shape and extend in a predetermined direction. In the present embodiment, the predetermined direction in which the pipes 31a extend is, for example, orthogonal to the rotational axis direction DR. The pipes 31a each open at the opposite ends thereof in the predetermined direction in which the pipe 31a extends. The pipes 31a each have, for example, a circular cross-sectional shape orthogonal to the predetermined direction, in which the pipe 31a extends. In the following description, the predetermined direction, in which the pipes 31a extend, is called an "extension direction (predetermined direction) DE" and drawn as appropriate in the form of an axis DE. The first region F1 and the second region F2 described above are separate, using the axis of rotation R as a standard, from each other in the extension direction DE orthogonal to the rotational axis direction DR.

In the present embodiment, the flow passage section 31 is formed by layering a plurality of layers, which are each formed of a plurality of pipes 31a arranged in the rotational axis direction DR, on each other in the direction orthogonal to both the rotational axis direction DR and the extension direction DE. In the following description, the direction orthogonal to both the rotational axis direction DR and the extension direction DE is called a "thickness direction DT" and drawn as appropriate in the form of an axis DT. In the present embodiment, the dimension of the flow passage section 31 in the thickness direction DT is, for example, smaller than the dimension of the flow passage section 31 in the rotational axis direction DR or is the smallest of the dimensions of the flow passage section 31 in the directions orthogonal to the extension direction DE. In the present specification, the extension direction DE, the rotational axis direction DR, and the thickness direction DT are the directions of a three-dimensional orthogonal coordinate system used to show the attitude of the heat exchanger 30.

The first lid 32 is connected to an end of the flow passage section 31 that is the end on one side in the extension direction DE (+DE side). The first lid 32 has the shape of a rectangular parallelepiped elongated in the rotational axis direction DR. One end of each of the pipes 31a in the extension direction DE opens in the first lid 32. A partition 32a is provided in the first lid 32, as shown in FIG. 3. The partition 32a partitions the interior of the first lid 32 into a first space S1 and a second space S2 disposed side by side in the rotational axis direction DR. In FIG. 3, the first space S1 is located on the right of the second space S2 (+DR side).

A communication hole 32b, which allows the first space S1 to be continuous with the interior of the circulation duct 26, is formed in the first lid 32. A communication hole 32c, which allows the second space S2 to be continuous with the interior of the circulation duct 25, is formed in the first lid 32.

The second lid 33 is connected to an end of the flow passage section 31 that is the end on the other side in the extension direction DE (−DE side), that is, the end opposite the end to which the first lid 32 is connected. The second lid 33 has the shape of a rectangular parallelepiped elongated in the rotational axis direction DR, as shown in FIG. 5. The other end of each of the pipes 31a in the extension direction DE opens in the second lid 33. The interior of the second lid 33 is not partitioned, unlike the first lid 32. The interior of the second lid 33 is continuous with the first space S1 and the second space S2 in the first lid 32 via the interior of the pipes 31a of the flow passage section 31. The second lid is connected to the refrigerant sender 50. The heat exchanger 30 is thus connected to the refrigerant sender 50. In FIG. 5, a wall of the second lid 33 that is the wall located on the other side in the extension direction DE is omitted.

The circulation duct 26 is a duct disposed on one side of the moisture absorbing/discharging member 40 in the rotational axis direction DR (+DR side), as shown in FIG. 3. The circulation duct 26 has an inlet that faces a portion of the moisture absorbing/discharging member 40 that is the portion located in the second region F2 and opens toward the other side in the rotational axis direction DR (−DR side). The circulation duct 26 has an outlet continuous with the communication hole 32b in the first lid 32.

The circulation duct 25 is a duct disposed on the other side of the moisture absorbing/discharging member 40 in the rotational axis direction DR (−DR side). The circulation duct 25 has an outlet that faces a portion of the moisture absorbing/discharging member 40 that is the portion located in the second region F2 and opens toward the one side in the rotational axis direction DR (+DR side). The circulation duct 25 has an inlet continuous with the communication hole 32c in the first lid 32.

The heater 22 includes a heating main body 22a. The heating main body 22a is disposed in the circulation duct 25. The heating main body 22a is disposed on the other side (−DR side), in the rotational axis direction DR, of a portion of the moisture absorbing/discharging member 40 that is the portion located in the second region F2. The heating main body 22a is, for example, an electric heater. The heating main body 22a heats the atmosphere in the circulation duct 25. In the present embodiment, the heater 22 includes a second air blower 23.

The second air blower 23 is disposed in the circulation duct 26. The second air blower 23 is disposed on the one side (+DR side), in the rotational axis direction DR, of a portion of the moisture absorbing/discharging member 40 that is the portion located in the second region F2. The second air blower 23 is, for example, a centrifugal fan. The second air blower 23 exhausts air sucked from the other side in the rotational axis direction DR (−DR side) via an exhaust port 23a toward the other side in the extension direction DE (−DE side). The exhaust port 23a opens toward the communication hole 32b in the first lid 32. The second air blower 23 delivers the air into the first space S1 via the communication hole 32b.

The air discharged from the second air blower 23 into the first space S1 is the air having been sucked from the other side of the second air blower 23 in the rotational axis direction DR (−DR side) via the inlet of the circulation duct and having passed through a portion of the moisture absorbing/discharging member 40 that is the portion located in the second region F2. That is, the second air blower 23 causes air to pass through a portion of the moisture absorbing/discharging member 40 that is the portion located in the second region F2, which differs from the first region F1, and delivers the air to the heat exchanger 30. In the present embodiment, the air before passing through a portion of the moisture absorbing/discharging member 40 that is the portion located in the second region F2 has flowed in the circulation duct 25. The heating main body 22a therefore heats the air before passing through a portion of the moisture absorbing/discharging member 40 that is the portion located in the second region F2.

As described above, in the present embodiment, the heater 22 is so configured that the second air blower 23 delivers the air heated by the heating main body 22a to a portion of the moisture absorbing/discharging member 40 that is the portion located in the second region F2 to heat a portion of the moisture absorbing/discharging member 40 that is the portion located in the second region F2. The second air blower thus delivers air around a portion of the moisture absorbing/discharging member 40 that is the portion heated by the heater 22 to the heat exchanger 30.

The air having flowed from the second air blower 23 into the heat exchanger 30 via the first space S1 passes through the pipes 31a continuous with the first space S1 out of the plurality of pipes 31a and flows into the second lid 33. The air having flowed into the second lid 33 passes through the pipes 31a continuous with the second space S2 out of the plurality of pipes 31a, flows into the second space S2, and flows into the circulation duct 25 via the communication hole 32c. The air having flowed into the circulation duct 25 is heated by the heating main body 22a, passes through a portion of the moisture absorbing/discharging member 40 that is the portion located in the second region F2 again, flows into the circulation duct 26, and is sucked by the second air blower 23.

As described above, in the present embodiment, the refrigerant generator 20 has a circulation path 27, through which the air exhausted from the second air blower 23 circulates. The circulation path 27 is formed of at least the circulation ducts 25 and 26 and the heat exchanger 30. The circulation path 27 passes through the heating main body 22a, the moisture absorbing/discharging member 40, and the heat exchanger 30. The circulation path 27 is roughly sealed although slight gaps are provided between the moisture absorbing/discharging member 40 and the circulation ducts 25, 26, and there is therefore no entry of air from the outside of the circulation path 27 into the circulation path 27. In the following description, the air exhausted from the second air blower 23 and circulating through the circulation path 27 is called air AR2.

The cooling duct 21 is a duct having an inlet disposed on the one side (+DR side), in the rotational axis direction DR, of a portion of the moisture absorbing/discharging member 40 that is the portion located in the first region F1. Air flowing into the cooling duct 21 is the air AR1 having been exhausted from the first air blower 60 and having passed through a portion of the moisture absorbing/discharging member 40 that is the portion located in the first region F1. The cooling duct 21 extends from the one side of a portion of the moisture absorbing/discharging member 40 that is the portion located in the first region F1 toward the heat exchanger 30.

The cooling duct 21 includes a cooling passage 21a, which extends in the rotational axis direction DR. The flow passage section 31 of the heat exchanger 30 is so disposed in the cooling passage 21a as to pass thereacross in the extension direction DE. The flow passage section 31 is thus disposed in the cooling passage 21a. The air AR1 passing through the cooling passage 21a is sprayed onto the outer surface of the flow passage section 31 and passes by the flow passage section 31 in the rotational axis direction DR. The flow passage section 31 is thus cooled by the air AR1. That is, the heat exchanger 30 is cooled by the air AR1 having been exhausted from the first air blower 60 and having passed through the moisture absorbing/discharging member 40. In FIG. 3, in the cooling passage 21a, the air AR1 passes by the flow passage section 31 from right to left. The cooling passage 21a has an open end facing the other side in the rotational axis direction DR (−DR side). The opening of the cooling passage 21a is, for example, of an outlet of the cooling duct 21.

When the air AR1 is delivered from the first air blower 60 to a portion of the moisture absorbing/discharging member 40 that is the portion located in the first region F1, water vapor contained in the air AR1 is absorbed by a portion of the moisture absorbing/discharging member 40 that is the portion located in the first region F1. A portion of the moisture absorbing/discharging member 40 that is the portion having absorbed the water vapor moves from the first region F1 to the second region F2 when the motor 24 rotates the moisture absorbing/discharging member 40. The air AR2 heated by the heating main body 22a and therefore having a relatively high temperature then passes through a portion of the moisture absorbing/discharging member 40 that is the portion located in the second region F2. The moisture absorbed by the moisture absorbing/discharging member 40 is thus vaporized, and the vaporized moisture is discharged into the air AR2.

The air AR2 containing the water vapor absorbed from the air AR1 when the air AR1 passes through the moisture absorbing/discharging member 40 is delivered by the second air blower 23 to the heat exchanger 30. The air AR2 having flowed from the first space S1 into the heat exchanger 30 flows through the flow passage section 31. In more detail, the air AR2 flows through part of the pipes 31a of the flow passage section 31. The flow passage section 31 is externally cooled by the air AR1 flowing in the rotational axis direction DR through the cooling passage 21a of the cooling duct 21.

When the flow passage section 31 is cooled, the air AR2 flowing through part of the pipes 31a and having a relatively high temperature is cooled, so that the water vapor contained in the air AR2 condenses into liquid water, that is, the refrigerant W. The flow passage section 31 (heat exchanger 30), when cooled, thus generates the refrigerant W from the air AR2 having flowed into the flow passage section 31 (heat exchanger 30). The refrigerant W generated in the flow passage section 31 is stored in the heat exchanger 30. Specifically, the generated refrigerant W moves to one of the flow passage section 31, the first lid 32, and the second lid 33 or a position on the lower side in the gravity direction in accordance with the attitude of the projector 1, and the moved refrigerant W is stored in the position. The heat exchanger 30, that is, the flow passage section 31, the first lid 32, and the second lid 33 therefore correspond to a storage that stores the refrigerant W.

In the present embodiment, the refrigerant sender 50 is formed of a porous member and sends the refrigerant W based on capillarity. Examples of the material of the refrigerant sender 50 may include polypropylene, cotton, and porous metal. The material of the refrigerant sender 50 preferably allows the refrigerant sender 50 to provide relatively large surface tension. The refrigerant sender 50 includes a first catcher 51, a second catcher 52, third catchers 53, and a connector 54, as shown in FIG. 5.

The first catcher 51 is fixed to an edge portion of the inner surface of the first lid 32 that is the edge portion facing the one side in the extension direction DE (+DE side). The first catcher 51 has a thin-band-like shape and is formed in a rectangular-frame-like shape extending along the edge portion of the first lid 32. The second catcher 52 is fixed to an edge portion of the inner surface of the second lid 33 that is the edge portion facing the other side in the extension direction DE (−DE side). The second catcher 52 has a thin-band-like shape and is formed in a rectangular-frame-like shape extending along the edge portion of the second lid 33.

The third catchers 53 extend from the first catcher 51, pass through the pipes 31a, and reach the second catcher 52, so that the third catchers 53 connect the first catcher 51 to the second catcher 52. The third catchers 53 each have a thin-band-like shape extending in the extension direction DE.

The connector 54 is a portion that connects the refrigerant generator 20 to the cooling target. In the present embodiment, the connector 54 is connected to the second catcher 52 and extends from the interior of the second lid 33, passes through the wall of the second lid 32, and protrudes out of the second lid 33. The connector 54, which protrudes out of the second lid 33, extends to the light modulation unit 4G, which is the cooling target (see FIG. 6). The connector 54 has a thin-band-like shape. The width of the connector 54 is, for example, greater than the width of the first catcher 51, the width of the second catcher 52, and the width of the third catchers 53.

The light modulation units 4R, 4G, and 4B, which are each the cooling target in the present embodiment, will next be described in more detail. In the following description, the direction parallel to an optical axis AX of a projection lens of the projection optical apparatus 6 that is the projection lens closest to the light exiting side, that is, the direction parallel to the direction in which the projection optical apparatus 6 projects light is called an "optical axis direction PX" and drawn as appropriate in the form of an axis PX. One of the directions orthogonal to the optical axis direction PX is called a "height direction PZ" and drawn as appropriate in the form of an axis PZ. The direction orthogonal to both the optical axis direction PX and the height direction PZ is called a "width direction PY" and drawn as appropriate in the form of an axis PY. In the present specification, the optical axis direction PX, the width direction PY, and the height direction PZ are the directions of the three-dimensional orthogonal coordinate system used to show the attitude of the projector 1.

The height direction PZ is the direction parallel to the short-side direction of a horizontally elongated image projected by the projector 1 in a case where the attitude of the projector 1 is a basic attitude, which will be described later. The width direction PY is the direction parallel to the long-side direction of a horizontally elongated image projected by the projector 1 in the case where the attitude of the projector 1 is the basic attitude, which will be described later.

The height direction PZ and the width direction PY are merely names for describing the relative positional relationship among the portions of the projector, and an actual arrangement and other factors of the portions may differ from the arrangement and other factors indicated by the names.

Figure 6:
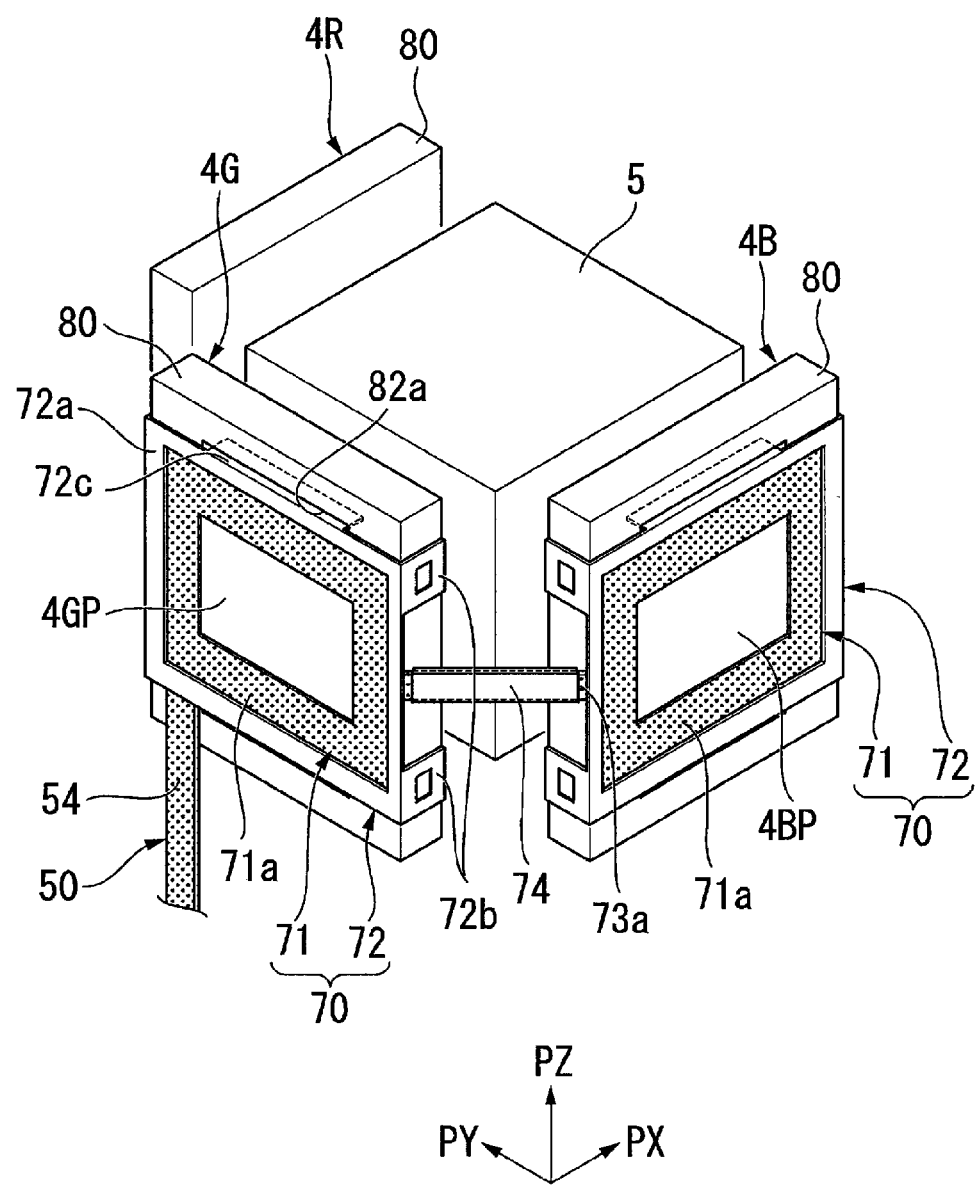
FIG. 6 is a perspective view showing light modulation units and a light combining system in the first embodiment.
Figure 7:
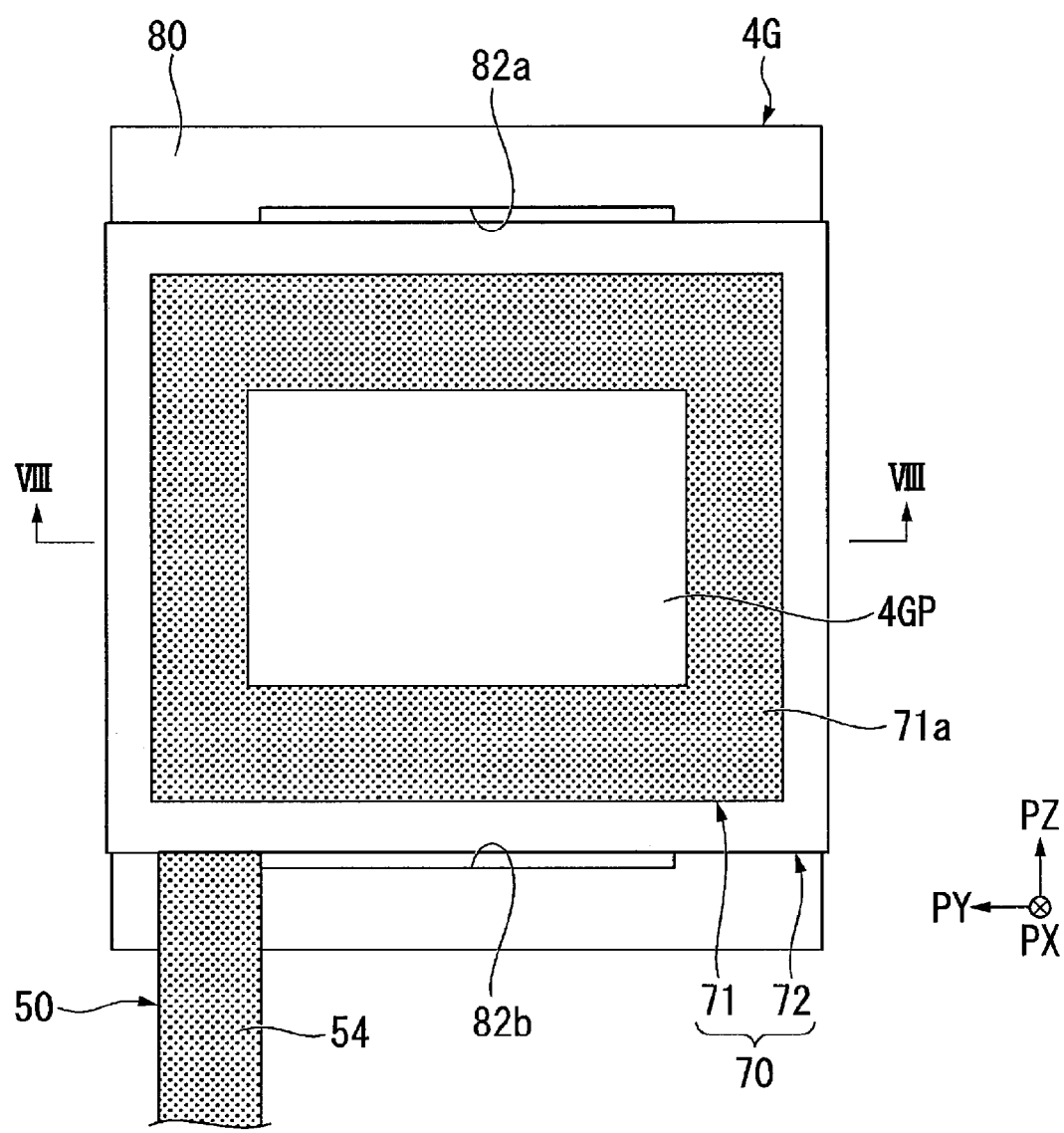
FIG. 7 shows one of the light modulation units in the first embodiment viewed from the light incident side.
Figure 8:
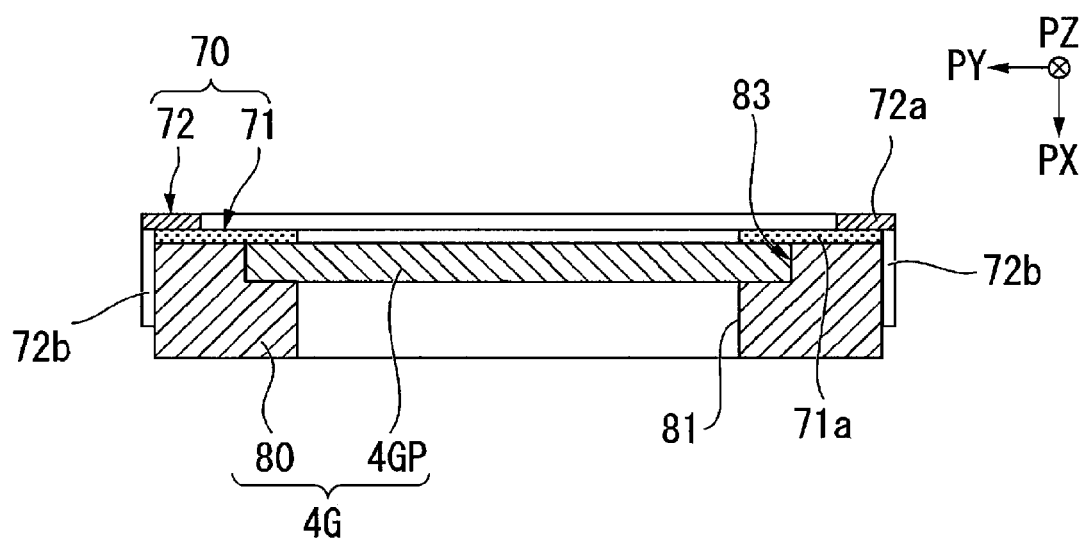
FIG. 8 is a cross-sectional view of the one light modulation unit in the first embodiment taken along the line VIII-VIII in FIG. 7.

FIG. 6 is a perspective view showing the light modulation units 4R, 4G, and 4B and the light combining system 5. FIG. 7 shows the light modulation unit 4G viewed from the light incident side. FIG. 8 is a cross-sectional view of the light modulation unit 4G taken along the line VIII-VIII in FIG. 7.

The light modulation units 4R, 4G, and 4B, which are each the cooling target, are so disposed as to surround the light combining system 5, as shown in FIG. 6. The light modulation units 4R and 4B are so disposed on the opposite sides as to sandwich the light combining system 5 in the width direction PY. The light modulation unit 4G is disposed on the light incident side of the light combining system 5 in the optical axis direction PX (−PX side). The light modulation units 4R, 4G, and 4B have the same structure except that they are disposed in different positions and take different attitudes, and only the light modulation unit 4G will therefore be representatively described below in some cases.

The light modulation unit 4G includes a holding frame 80, which holds the light modulator 4GP. The holding frame 80 has the shape of a roughly rectangular parallelepiped that is flat in the direction in which light is incident on the light modulator 4GP and elongated in the height direction PZ, as shown in FIGS. 6 to 8. The direction in which light is incident on the light modulator 4GP is, for example, the optical axis direction PX.

The holding frame 80 has a through hole 81, which passes through the holding frame 80 in the light incident direction, as shown in FIG. 8. A stepped section 83, where the width of the through hole 81 increases, is provided along an edge of the through hole 81 that is the edge on the light incident side (−PX side in FIG. 8). The light modulator 4GP is so held by the holding frame 80 as to be fit into the stepped section 83. Insertion grooves 82a and 82b are formed through a surface of the holding frame 80 that is the surface facing the light incident side and in portions on the opposite sides of the holding frame 80 in the height direction PZ, as shown in FIG. 7.

The projector 1 further includes a cooling facilitator 70 provided as part of the light modulation unit 4G, which is the cooling target, as shown in FIGS. 6 to 8. The cooling facilitator 70 includes a refrigerant holder 71 and a fixing member 72. The refrigerant holder 71 is attached to the surface of the holding frame 80, which holds the light modulation unit 4G, which is the cooling target, and is connected to the light modulation unit 4G. In the present embodiment, the refrigerant holder 71 is provided on a surface of the holding frame 80 that is the surface facing the side toward which light is incident on the light modulator 4GP (−PX side). The refrigerant holder 71 is formed of a porous member that holds the refrigerant W. Examples of the material of the refrigerant holder 71 may include polypropylene, cotton, and porous metal. The material of the refrigerant holder 71 can, for example, be the same material of the refrigerant sender 50. The material of the refrigerant holder 71 preferably allows the refrigerant holder 71 to provide relatively large surface tension.

Figure 9:
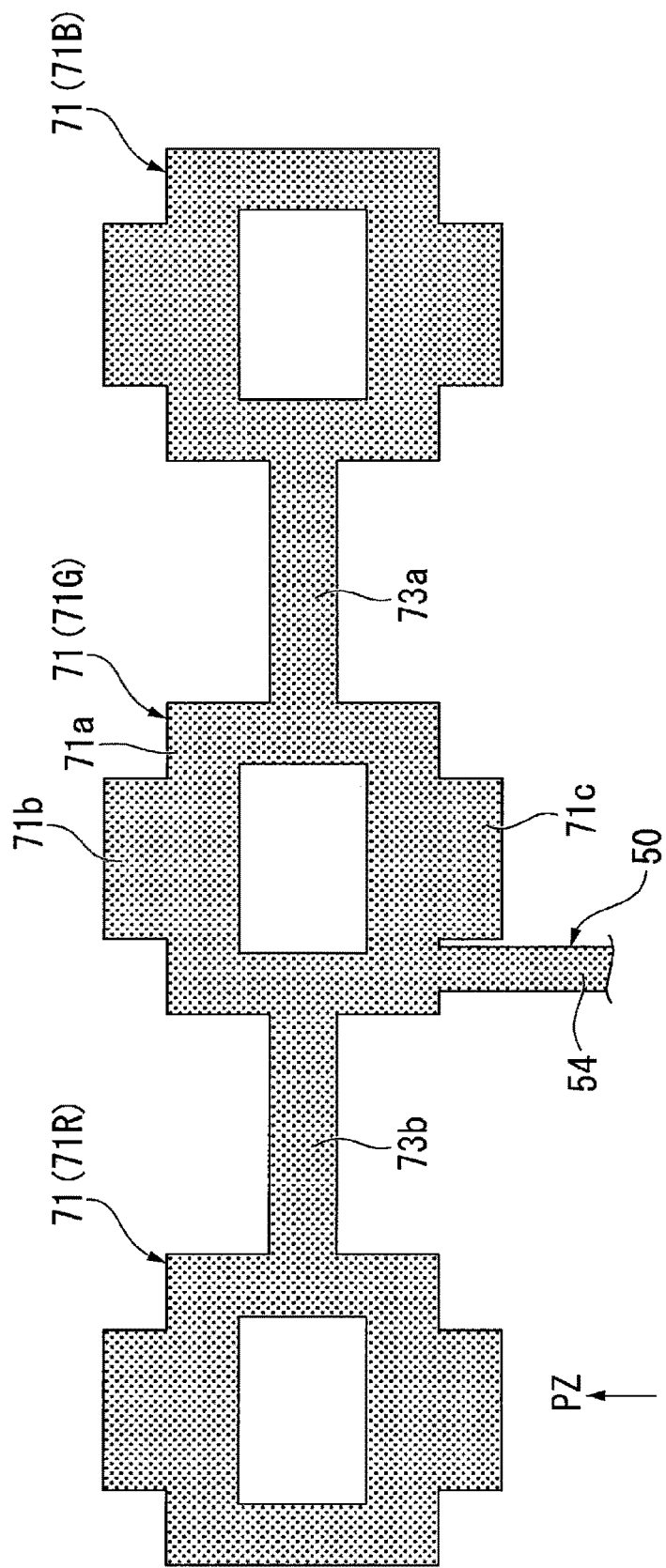
FIG. 9 shows refrigerant holders in the first embodiment.

FIG. 9 shows the refrigerant holder 71. The refrigerant holder 71 includes a main body section 71a, which has a rectangular-frame-like shape, and insertion sections 71b and 71c, which are provided at opposite ends of the main body section 71a in the height direction PZ, as shown in FIG. 9. The main body section 71a covers part of a surface of the holding frame 80 that is the surface facing the side toward which light is incident on the light modulator 4GP (−PX side), as shown in FIG. 8. An inner edge portion of the main body section 71a covers an outer edge portion of the light modulator 4GP. The insertion section 71b is bent and inserted into the insertion groove 82a of the holding frame 80. The insertion section 71c is bent and inserted into the insertion groove 82b of the holding frame 80.

The fixing member 72 is a member that fixes the refrigerant holder 71. The fixing member 72 is a plate-shaped member as shown in FIGS. 6 and 8. The fixing member 72 is made, for example, of a metal. The fixing member 72 includes a frame section 72a, which has a rectangular-frame-like shape, attachment sections 72b, and insertion sections 72c. The frame section 72a covers an outer edge portion of the refrigerant holder 71, as shown in FIGS. 7 and 8. The holding frame 80, the refrigerant holder 71, and the frame section 72a are layered on each other in the direction in which light passes through the light modulator unit 4G (optical axis direction PX). In the following description, the direction in which the holding frame 80, the refrigerant holder 71, and the frame section 72a are layered on each other is simply called a "layering direction." The fixing member 72 fixes the refrigerant holder 71 in such a way that the frame section 72a and the holding frame 80 sandwich the refrigerant holder 71 in the layering direction (optical axis direction PX).

The inner edge of the frame section 72a is so provided as to be shifted outward from the inner edge of the refrigerant holder 71. A portion of the refrigerant holder 71, that is, in the present embodiment, the portion inside the frame section 72a is exposed when viewed in the layering direction from the side facing the fixing member 72.

The attachment sections 72b are provided at end portions of the frame section 72a, opposite end portions in the height direction PZ and opposite end portions in the width direction PY, as shown in FIGS. 6 and 8. The attachment sections 72b protrude from the frame section 72a toward the holding frame 80 (+PX side). The attachment sections 72b engage with protrusions provided on the side surface of the holding frame 80. The fixing member 72 is thus fixed to the holding frame 80.

The insertion sections 72c are provided at the opposite ends of the frame section 72a in the height direction PZ. The insertion sections 72c protrude from the frame section 72a toward the holding frame 80 (+PX side). The insertion sections 72c are inserted into the insertion grooves 82a and 82b of the holding frame 80. The insertion sections 72c press the insertion sections 71b and 71c of the refrigerant holder 71 in the insertion grooves 82a and 82b.

The cooling facilitator 70 is provided in each of the plurality of light modulation units 4R, 4G, and 4B. That is, the refrigerant holder 71 and the fixing member 72 are provided in each of the plurality of light modulation units 4R, 4G, and 4B. A refrigerant holder 71G provided in the light modulation unit 4G out of the light modulation units 4R, 4G, and 4B is connected to the refrigerant sender 50, as shown in FIG. 9. In more detail, the connector 54 of the refrigerant sender 50 is connected to the lower end of the refrigerant holder 71G.

A refrigerant holder 71B attached to the light modulation unit 4B and a refrigerant holder 71R attached to the light modulation unit 4R are the same as the refrigerant holder 71G attached to the light modulation unit 4G except that no connector 54 is connected to the refrigerant holder 71B or the refrigerant holder 71R.

In the present embodiment, linkage sections 73a and 73b, which are each formed of a porous member, are provided and link the refrigerant holders 71, which are provided in the plurality of light modulation units 4R, 4G, and 4B, to each other. In the present embodiment, the refrigerant holder 71B attached to the light modulation unit 4B and the refrigerant holder 71R attached to the light modulation unit 4R are linked to the opposite sides of the refrigerant holder 71G, which is attached to the light modulation unit 4G, via the linkage sections 73a and 73b.

The linkage section 73a links the refrigerant holder 71G attached to the light modulation unit 4G to the refrigerant holder 71B attached to the light modulation unit 4B. The refrigerant holder 71B is thus connected to the refrigerant sender 50 (connector 54) via the refrigerant holder 71G. The linkage section 73a is provided with a coating 74, which coats the linkage section 73a, as shown in FIG. 6. The coating 74 is, for example, a film made of a resin.

The linkage section 73b links the refrigerant holder 71G attached to the light modulation unit 4G to the refrigerant holder 71R attached to the light modulation unit 4R. The refrigerant holder 71R is thus connected to the refrigerant sender 50 (connector 54) via the refrigerant holder 71G. Although not shown, the linkage section 73b is similarly provided with a coating 74, as is the linkage section 73a.

The refrigerant W generated by the refrigerant generator 20 is sent to the refrigerant holder 71G via the connector 54 of the refrigerant sender 50. The refrigerant W sent to the refrigerant holder 71G is sent to the refrigerant holder 71B via the linkage section 73a and to the refrigerant holder 71R via the linkage section 73b. The refrigerant W generated by the refrigerant generator 20 is thus sent to the three light modulation units 4R, 4G, and 4B. The refrigerant W sent to and held by the refrigerant holders 71 then vaporizes when the refrigerant W receives heat from the light modulation units 4R, 4G, and 4B to cool the light modulation units 4R, 4G, and 4B, which are each the cooling target.

According to the present embodiment, the cooler 10 is so configured that the refrigerant sender 50 can send the refrigerant W generated by the refrigerant generator 20 to the cooling target and vaporization of the refrigerant W, which is an endothermic reaction, can be used to draw heat from the cooling target to cool the cooling target. The cooling based on the vaporization of the refrigerant W can actively draw heat from the cooling target and therefore has excellent cooling performance as compared with air cooling and liquid cooling, in which a cooling target is cooled based merely on heat transfer to a refrigerant. Therefore, to provide the same cooling performance as that provided by air cooling or liquid cooling, the overall size of the cooler 10 is readily reduced as compared with the size required by air cooling or liquid cooling.

Further, in the cooling based on the vaporization of the refrigerant W, the cooling performance can be improved by an increase in the surface area where the refrigerant W that vaporizes comes into contact with the cooling target. The increase in the cooling performance of the cooler 10 therefore causes no increase in noise. The projector 1 according to the present embodiment can therefore include the cooler 10 that not only excels in cooling performance but has a compact size and excels in quietness.

According to the present embodiment, in which the refrigerant generator 20 can generate the refrigerant W, a user's convenience can be improved because the user does not need to replenish the refrigerant W.

According to the present embodiment, the moisture absorbing/discharging member 40 can absorb water vapor contained in the air AR1 delivered from the first air blower 60, and the moisture absorbed by the moisture absorbing/discharging member 40 can be discharged in the form of water vapor into the air AR2 delivered by the second air blower 23. The flow passage section 31 of the heat exchanger 30, into which the air AR2 delivered from the second air blower 23 flows, can then condense the moisture discharged in the form of water vapor into the air AR2 to generate the refrigerant W. Therefore, according to the present embodiment, the refrigerant W can be generated from the atmosphere in the projector 1.

According to the present embodiment, the refrigerant sender 50 sends the refrigerant W based on capillarity. No pump or any other power source for sending the refrigerant W therefore needs to be separately provided. An increase in the number of parts of the projector 1 can therefore be avoided, whereby the size and weight of the projector 1 are each readily reduced by a greater amount.

According to the present embodiment, the refrigerant sender 50 includes the connector 54, which is formed of a porous member and connects the refrigerant generator 20 to the cooling target. The connector 54 can therefore absorb the refrigerant W and send the refrigerant W based on capillarity.

According to the present embodiment, the refrigerant sender 50 includes the second catcher 52 provided in the second lid 33. The second catcher 52 is connected to the connector 54. The second catcher 52 can therefore absorb the refrigerant W having flowed via the pipes 31a into the second lid 33 and having accumulated in the second lid 33 as described above and send the absorbed refrigerant W to the connector 54 based on capillarity. Therefore, the refrigerant sender 50 readily sends the refrigerant W, and the generated refrigerant W is readily delivered with no waste to the cooling target.

According to the present embodiment, the refrigerant sender 50 includes the first catcher 51, which is provided in the first lid 32, and the third catchers 53, which connect the first catcher 51 to the second catcher 52. The first catcher 51 can therefore absorb the refrigerant W having accumulated in the first lid 32 and send the absorbed refrigerant W to the second catcher 52 via the third catchers 53 based on capillarity. The refrigerant W having accumulated in the first lid 32 can therefore be sent from the second catcher 52 to the connector 54, which can then send the refrigerant W to the cooling target. The generated refrigerant W is therefore readily delivered with no waste to the cooling target. Further, even when the attitude of the projector 1 is changed, and one of the first lid 32 and the second lid 33 is located on the lower side in the gravity direction, the refrigerant sender 50 can preferably send the refrigerant W.

According to the present embodiment, the third catchers 53 pass through the pipes 31a. The third catchers 53 can therefore absorb the refrigerant W having accumulated in the pipes 31a and send the absorbed refrigerant W to the cooling target via the second catcher 52 and the connector 54. The generated refrigerant W is therefore readily delivered with no waste to the cooling target. Further, for example, even in a case where the refrigerant W is unlikely to move under gravity in the pipes 31a, the refrigerant W can be sent from the interior of the pipes 31a via the third catchers 53. The accumulation of the refrigerant W in the pipes 31a can therefore be further avoided.

According to the present embodiment, the width of the connector 54 is greater, for example, than the width of the first catcher 51, the width of the second catcher 52, and the width of the third catchers 53. The width of the connector 54 is therefore readily increased to a relatively large value, whereby the amount of refrigerant W that can be sent by the connector 54 can be increased. The refrigerant sender 50 therefore readily delivers the refrigerant W to the cooling target, whereby the cooling target is readily further cooled.

On the other hand, the width of the first catcher 51, the width of the second catcher 52, and the width of the third catchers 53 are each readily set at a relatively small value. The amount of refrigerant W held by each of the first catcher 51, the second catcher 52, and the third catchers 53 can therefore be reduced. The amount of refrigerant W held by the first catcher 51, the second catcher 52, and the third catchers 53 and hence left in the heat exchanger 30 can therefore be reduced, whereby the generated refrigerant W is readily delivered with no waste to the cooling target.

According to the present embodiment, the heat exchanger 30 is cooled by the air AR1 having been exhausted from the first air blower 60 and having passed through the moisture absorbing/discharging member 40. No refrigerant holder that cools the heat exchanger 30 therefore needs to be separately provided, whereby an increase in the number of parts of the projector 1 can be avoided. Further, an increase in noise produced by the projector 1 can be avoided unlike in a case where an air blower is separately provided as the refrigerant holder that cools the heat exchanger 30.

According to the present embodiment, the first air blower 60 delivers the air AR1 to the light modulation units 4R, 4G, and 4B, which are each the cooling target. The air AR1 therefore causes the refrigerant W sent to the light modulation units 4R, 4G, and 4B to readily vaporize, whereby the light modulation units 4R, 4G, and 4B can be further cooled. Further, since no air blower that cools the cooling target needs to be separately provided, an increase in the number of parts of the projector 1 can be avoided, and an increase in the noise can be avoided.

In the present embodiment, the first air blower 60, which is an intake fan that takes the outside air into the projector 1, is used to facilitate the vaporization of the refrigerant W delivered to the cooling target, as described above. Therefore, even when the power of the first air blower 60 is lowered, the same cooling performance provided in a case where no cooler 10 is provided can still be provided. The noise produced by the first air blower 60, which is an intake fan, can therefore be reduced by lowering the power of the first air blower 60, whereby the quietness of the projector 1 can be further improved.

For example, in the refrigerant generator 20, when the humidity of the air AR2 delivered from the second air blower 23 to the heat exchanger 30 is relatively low, cooling the heat exchanger 30 is unlikely to allow generation of the refrigerant W in some cases. For example, in a case where air or any other substance outside the projector 1 mixes with the air AR2 delivered to the heat exchanger 30, the humidity of the air AR2 decreases in some cases.

In contrast, according to the present embodiment, the refrigerant generator 20 has the circulation path 27, through which the air AR2 exhausted from the second air blower 23 circulates. Configuring the circulation path 27 as a roughly sealed path can therefore prevent the air outside the projector 1 from entering the circulation path 27, whereby the humidity of the air AR2 delivered to the heat exchanger 30 can be maintained relatively high. Cooling the heat exchanger 30 therefore allows the refrigerant W to be preferably generated.

According to the present embodiment, the heater 22 includes the heating main body 22a, which heats the air before passing through a portion of the moisture absorbing/discharging member 40 that is the portion located in the second region F2, and the second air blower 23. The heater 22, in which the second air blower 23 delivers the air AR2 to the moisture absorbing/discharging member 40, can therefore heat a portion of the moisture absorbing/discharging member 40 that is the portion located in the second region F2. The heater 22 can therefore heat the moisture absorbing/discharging member 40 even in the configuration in which the heating main body 22a is located in a position separate from the moisture absorbing/discharging member 40. The heater 22 can therefore be configured with improved flexibility.

According to the present embodiment, the refrigerant generator 20 includes the motor 24, which rotates the moisture absorbing/discharging member 40. The moisture absorbing/discharging member 40 can therefore be stably rotated at a fixed speed. Therefore, a portion of the moisture absorbing/discharging member 40 that is the portion located in the first region F1 can preferably absorb water vapor from the air AR1, and a portion of the moisture absorbing/discharging member 40 that is the portion located in the second region F2 can preferably discharge moisture into the air AR2. The refrigerant W can therefore be efficiently generated.

According to the present embodiment, the refrigerant holders 71, which hold the refrigerant W, are connected to the light modulation units 4R, 4G, and 4B, which are each the cooling target. The refrigerant holders 71 therefore allow the refrigerant W sent to the light modulation units 4R, 4G, and 4B to be held in the light modulation units 4R, 4G, and 4B until the refrigerant W vaporizes. The generated refrigerant W is therefore readily used with no waste, whereby the cooling performance of the cooler 10 can be further improved.

According to the present embodiment, the refrigerant holders 71 are attached to surfaces of the light modulation units 4R, 4G, and 4B, which are each the cooling target, and the refrigerant holders 71 are each formed of a porous member. At least part of each of the refrigerant holders 71 is exposed when viewed in the layering direction from the side facing the refrigerant holder 71. The refrigerant W therefore readily vaporizes via the exposed portion of each of the refrigerant holders 71, whereby the cooling performance of the cooler 10 can be further improved. Further, the refrigerant holders 71, which are each formed of a porous member, readily uniformly distribute the refrigerant W across the surfaces of the cooling target, which is provided with the refrigerant holders 71, based on capillarity, whereby the cooling target is readily further cooled.

For example, in a case where the refrigerant holders 71 are fixed to the holding frames 80 with an adhesive, the pores in the refrigerant holders 71, which are each formed of a porous member, are closed with the adhesive absorbed by the refrigerant holders 71 in some cases. The refrigerant holders 71 are therefore unlikely to absorb and hold the refrigerant W in some cases.

In contrast, according to the present embodiment, the fixing members 72 are so provided as to fix the refrigerant holders 71 in such a way that the fixing members 72 and the holding frames 80 sandwich the refrigerant holders 71. The refrigerant holders 71 can therefore be fixed to the holding frames 80 with no adhesive adhering to the refrigerant holders 71. The situation in which the refrigerant holders 71 are unlikely to hold the refrigerant W can therefore be avoided. Further, in the present embodiment, the fixing members 72 are made of a metal. The fixing members 72 therefore have relatively high heat conductivity and are hence likely to be cooled. The air AR1 from the first air blower 60 and the vaporization of the refrigerant W readily lower the temperature of the fixing members 72, whereby the cooling target, which is in contact with fixing members 72, is readily further cooled.

According to the present embodiment, the refrigerant holder 71 is provided on a surface of the holding frame 80 that is the surface facing the side toward which light is incident on the light modulator 4GP. The configuration described above can prevent the water vapor that is the vaporized refrigerant W discharged from the refrigerant holder 71 from affecting the light that exits out of the light modulator 4GP toward the light combining system 5 and can therefore prevent formation of noise in an image projected from the projector 1.

According to the present embodiment, the refrigerant holders 71 are provided in the plurality of light modulation units 4R, 4G, and 4B, and the linkage sections 73a and 73b are provided and link the plurality of refrigerant holders 71 to each other. Connecting the refrigerant sender 50 to one of the refrigerant holders 71 therefore allows the refrigerant W to be sent to the other refrigerant holders 71. The routing of the refrigerant sender 50 in the projector 1 can therefore be simplified.

According to the present embodiment, the linkage sections 73a and 73b are provided with the coatings 74, which coat the linkage sections 73a and 73b. A situation in which the refrigerant W that moves along the linkage sections 73a and 73b vaporizes via the linkage sections 73a and 73b can therefore be avoided. Therefore, a situation in which the refrigerant W vaporizes without contributing to the cooling of the light modulation units 4R, 4G, and 4B, which are each the cooling target, can be avoided, whereby no waste of the generated refrigerant W occurs.

In the present embodiment, the connector 54 may also be coated, as are the linkage sections 73a and 73b. The configuration described above can prevent vaporization of the refrigerant W being sent to the cooling target. Therefore, the refrigerant W can be efficiently sent to the cooling target, and waste of the generated refrigerant W can be further suppressed. The circumference of each of the connector 54 and the linkage sections 73a and 73b may instead be covered, for example, with a tube. A coating treatment that suppresses vaporization may still instead be performed on the surface of each of the connector 54 and the linkage sections 73a and 73b.

A detailed description will next be made of the positional relationship among the heat exchanger 30, the cooling target (light modulation units 4R, 4G, and 4B), and the refrigerant holders 71 in the projector 1. In the following description, the direction of gravity (vertical direction) is called a "gravity direction Z" and drawn as appropriate in the form of an axis Z. It is assumed that the positive side of the axis Z is the "upper side in the gravity direction," and that the negative side of the axis Z is the "lower side in the gravity direction." One of the horizontal directions orthogonal to the gravity direction Z is called a "rightward/leftward direction Y" and drawn as appropriate in the form of an axis Y. One of the horizontal directions orthogonal to the gravity direction Z and orthogonal to the rightward/leftward direction Y is called a "frontward/rearward direction X" and drawn as appropriate in the form of an axis X.

Figure 10:
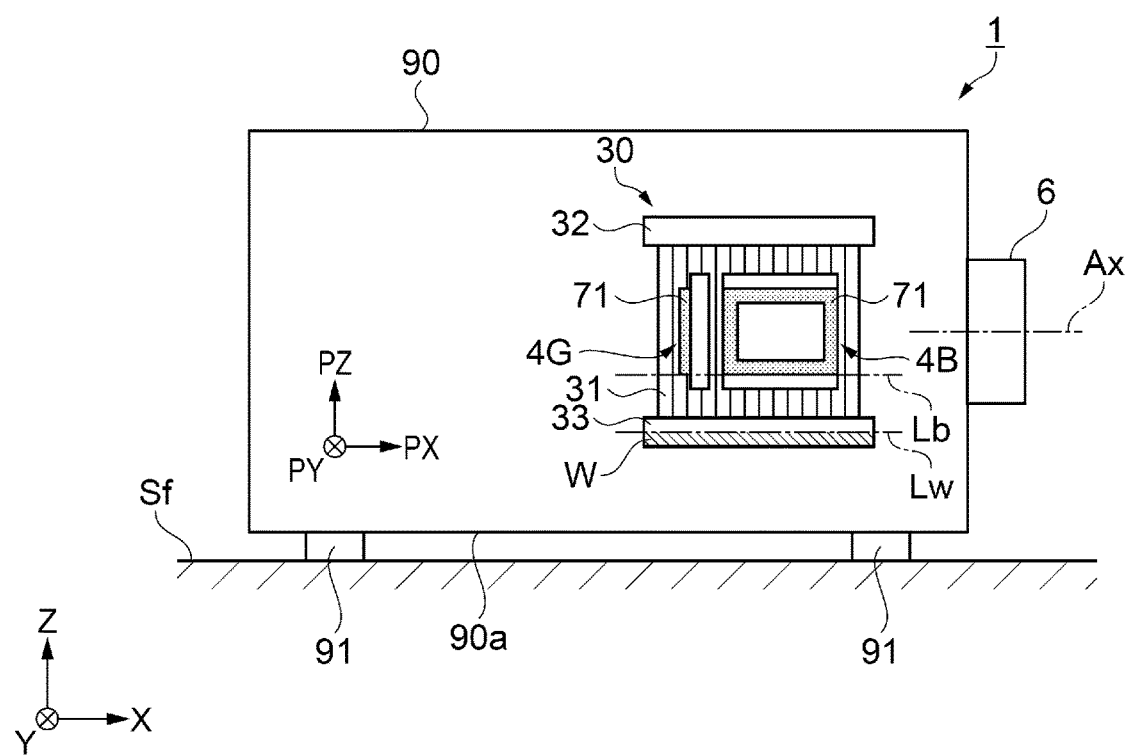
FIG. 10 shows the positional relationship among the heat exchanger, the light modulation units, and the refrigerant holders in the projector according to the first embodiment and also shows the projector in a basic attitude.

FIGS. 10 to 14 are each a perspective view showing the positional relationship among the heat exchanger 30, the light modulation units 4R, 4G, and 4B, and the refrigerant holders 71 in the projector 1. In FIG. 10, the projector 1 is installed, for example, on a floor surface Sf. In FIG. 10, the attitude of the projector 1 is so set that the optical axis direction PX is parallel to the frontward/rearward direction X, the width direction PY is parallel to the rightward/leftward direction Y, and the height direction PZ is parallel to the gravity direction Z.

The projector 1 further includes an enclosure 90, which accommodates the portions of the projector 1, as shown in FIG. 10. The enclosure 90 has the shape of a rectangular parallelepiped, and each surface of the enclosure 90 extends in any of the optical axis direction PX, the width direction PY, and the height direction PZ. The enclosure 90 has a bottom surface 90a, which faces the floor surface Sf. The bottom surface 90a is a surface along the optical axis direction PX parallel to the optical axis AX of the projection optical apparatus 6. The bottom surface 90a is orthogonal to the height direction PZ. In FIG. 10, the bottom surface 90a is a surface of the enclosure 90 that is the surface facing the lower side in the gravity direction, and the bottom surface 90a is orthogonal to the gravity direction Z. In the attitude shown in FIG. 10, the bottom surface 90a faces the floor surface Sf via legs 91. The attitude shown in FIG. 10 is hereinafter also called a "basic attitude."

In FIG. 10, the heat exchanger 30 is so disposed as to take an attitude that causes the heat exchanger 30 to be located on the positive side of the light modulation units 4R, 4G, and 4B and the refrigerant holders 71 in the width direction PY and the flow passage section 31 to be perpendicular to the width direction PY. The first lid 32 and the second lid 33 are so disposed that the two lids both take an attitude parallel to the optical axis direction PX and the first lid 32 is above the second lid 33 in the gravity direction. The heat exchanger 30, the light modulation units 4R, 4G, and 4B, and the refrigerant holders 71 are so disposed that when they are projected on an imaginary plane (first plane) perpendicular to the width direction PY, the heat exchanger 30 extends off the light modulation units 4R, 4G, and 4B and the refrigerant holders 71 on both the positive and negative sides in the optical axis direction PX parallel to the imaginary plane and on both the positive and negative sides in the height direction PZ parallel to the imaginary plane and orthogonal to the optical axis direction PX.

The attitude of the projector 1 is not limited to the basic attitude shown in FIG. 10, and the projector 1 is installed in any of the attitudes shown in FIGS. 11 to 14 in some cases. FIGS. 11 to 14 show the projector 1 installed in attitudes other than the basic attitude.

Figure 11:
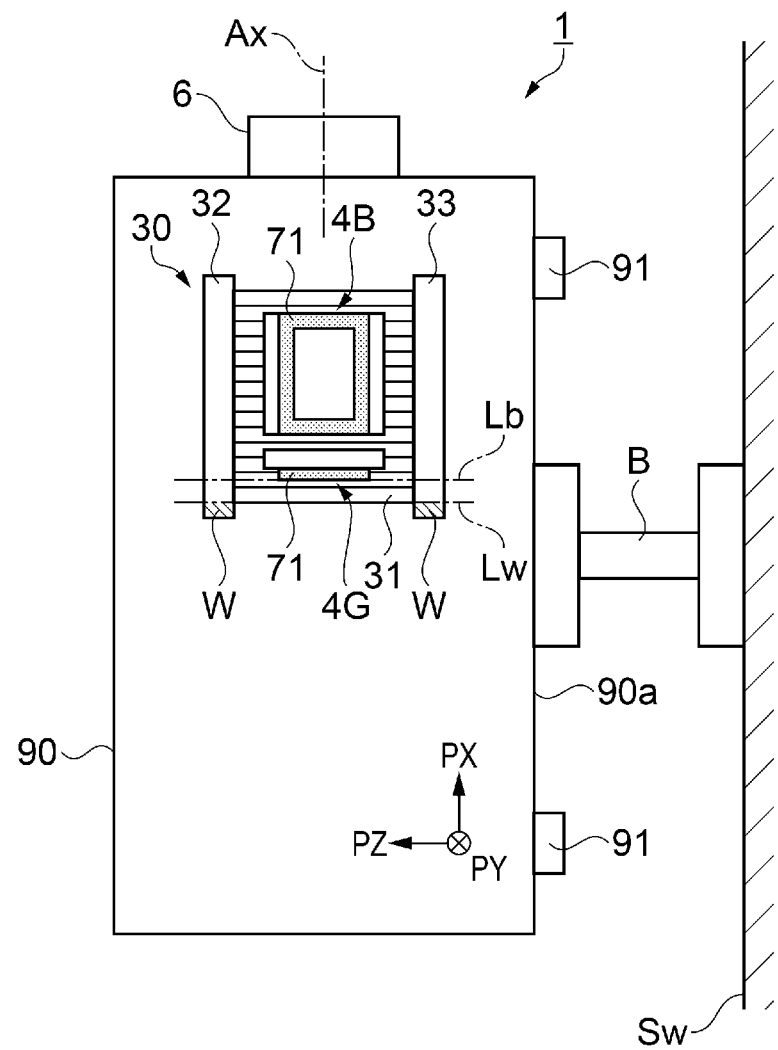
FIG. 11 shows the positional relationship among the heat exchanger, the light modulation units, and the refrigerant holders in the projector according to the first embodiment and also shows the projector in an upward projection attitude.

In FIG. 11, the attitude of the projector 1 differs from the basic attitude shown in FIG. 10 in that the projector 1 is rotated by 90° around an axis parallel to the horizontal width direction PY counterclockwise when viewed from the negative side in the width direction PY. In FIG. 11, the optical axis direction PX is parallel to the gravity direction Z, the width direction PY is parallel to the rightward/leftward direction Y, and the height direction PZ is parallel to the frontward/rearward direction X. In the attitude shown in FIG. 11, a fixing member B fixes the projector 1 to a wall surface Sw, and the bottom surface 90a of the enclosure 90 faces the wall surface Sw. In the attitude shown in FIG. 11, the projector 1 projects an image toward the upper side in the gravity direction. The attitude in FIG. 11 is also hereinafter called an "upward projection attitude."

Figure 12:
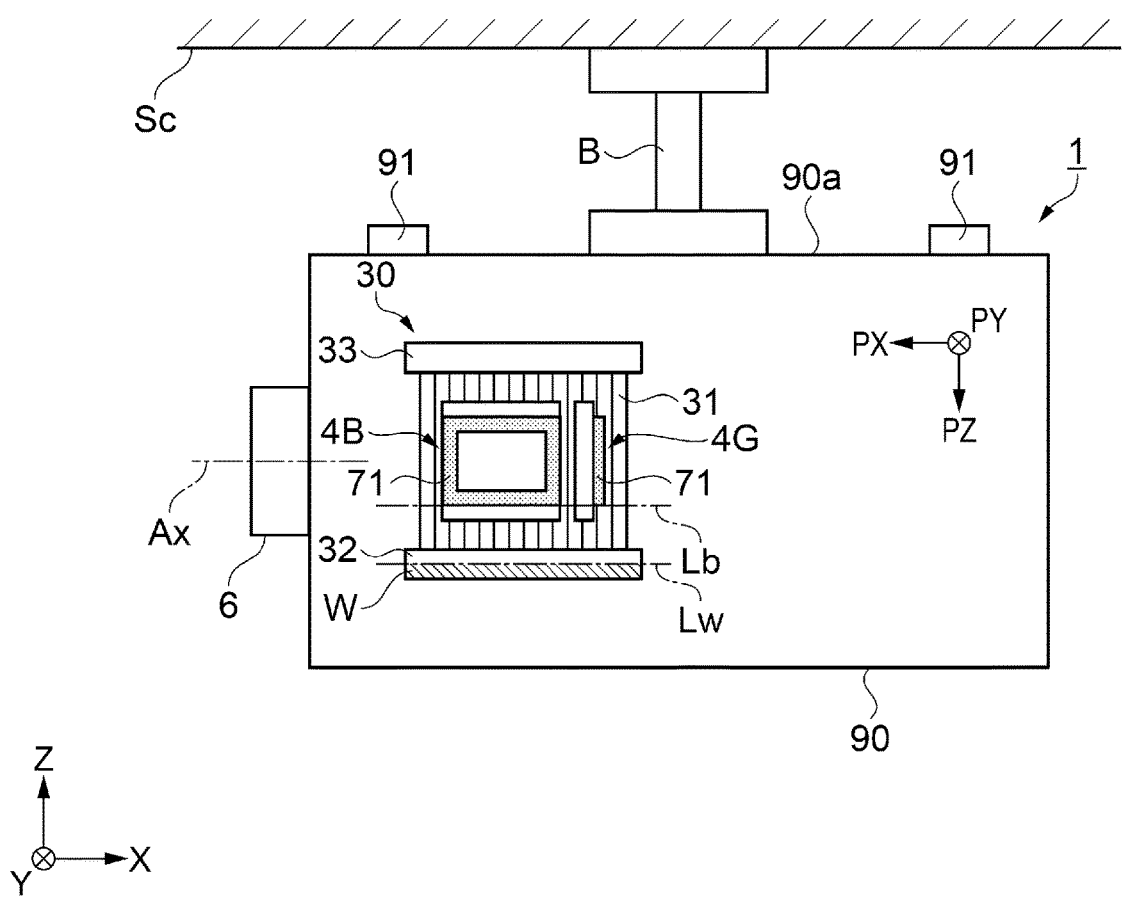
FIG. 12 shows the positional relationship among the heat exchanger, the light modulation units, and the refrigerant holders in the projector according to the first embodiment and also shows the projector in an inverted attitude.

In FIG. 12, the attitude of the projector 1 differs from the basic attitude shown in FIG. 10 in that the projector 1 is rotated by 180° around the axis parallel to the horizontal width direction PY. In other words, the attitude of the projector 1 differs from the upward projection attitude shown in FIG. 11 in that the projector 1 is rotated by 90° around the axis parallel to the horizontal width direction PY counterclockwise when viewed from the negative side in the width direction PY. In FIG. 12, the optical axis direction PX is parallel to the frontward/rearward direction X, the width direction PY is parallel to the rightward/leftward direction Y, and the height direction PZ is parallel to the gravity direction Z, as in the basic attitude. In the attitude shown in FIG. 12, the fixing member B fixes the projector 1 to a ceiling surface Sc, and the bottom surface 90a of the enclosure 90 faces the ceiling surface Sc. The attitude in FIG. 12 is also called an "inverted attitude."

Figure 13:
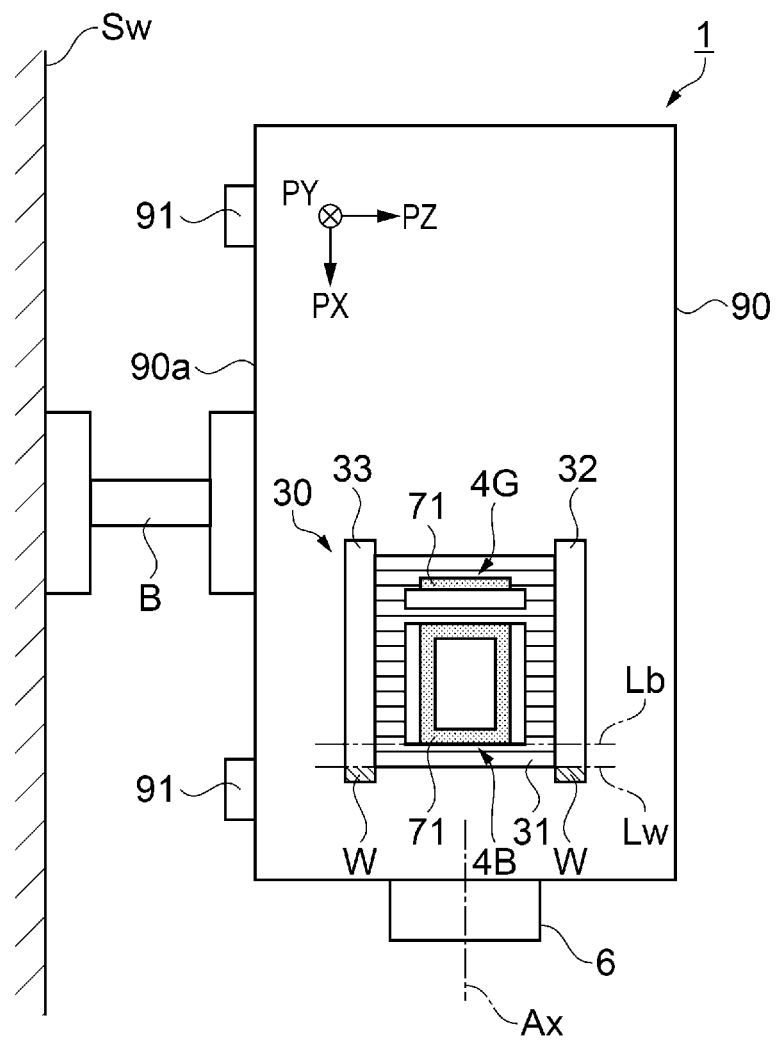
FIG. 13 shows the positional relationship among the heat exchanger, the light modulation units, and the refrigerant holders in the projector according to the first embodiment and also shows the projector in a downward projection attitude.

In FIG. 13, the attitude of the projector 1 differs from the basic attitude shown in FIG. 10 in that the projector 1 is rotated by 270° around the axis parallel to the horizontal width direction PY counterclockwise when viewed from the negative side in the width direction PY. In other words, the attitude of the projector 1 differs from the inverted attitude shown in FIG. 12 in that the projector 1 is rotated by 90° around the axis parallel to the horizontal width direction PY counterclockwise when viewed from the negative side in the width direction PY. In FIG. 13, the optical axis direction PX is parallel to the gravity direction Z, the width direction PY is parallel to the rightward/leftward direction Y, and the height direction PZ is parallel to the frontward/rearward direction X, as in the upward projection attitude. In the attitude shown in FIG. 13, the fixing member B fixes the projector 1 to the wall surface Sw, and the bottom surface 90a of the enclosure 90 faces the wall surface Sw. In the attitude shown in FIG. 13, the projector 1 projects an image toward the lower side in the gravity direction. The attitude in FIG. 13 is also hereinafter called a "downward projection attitude."

Figure 14:
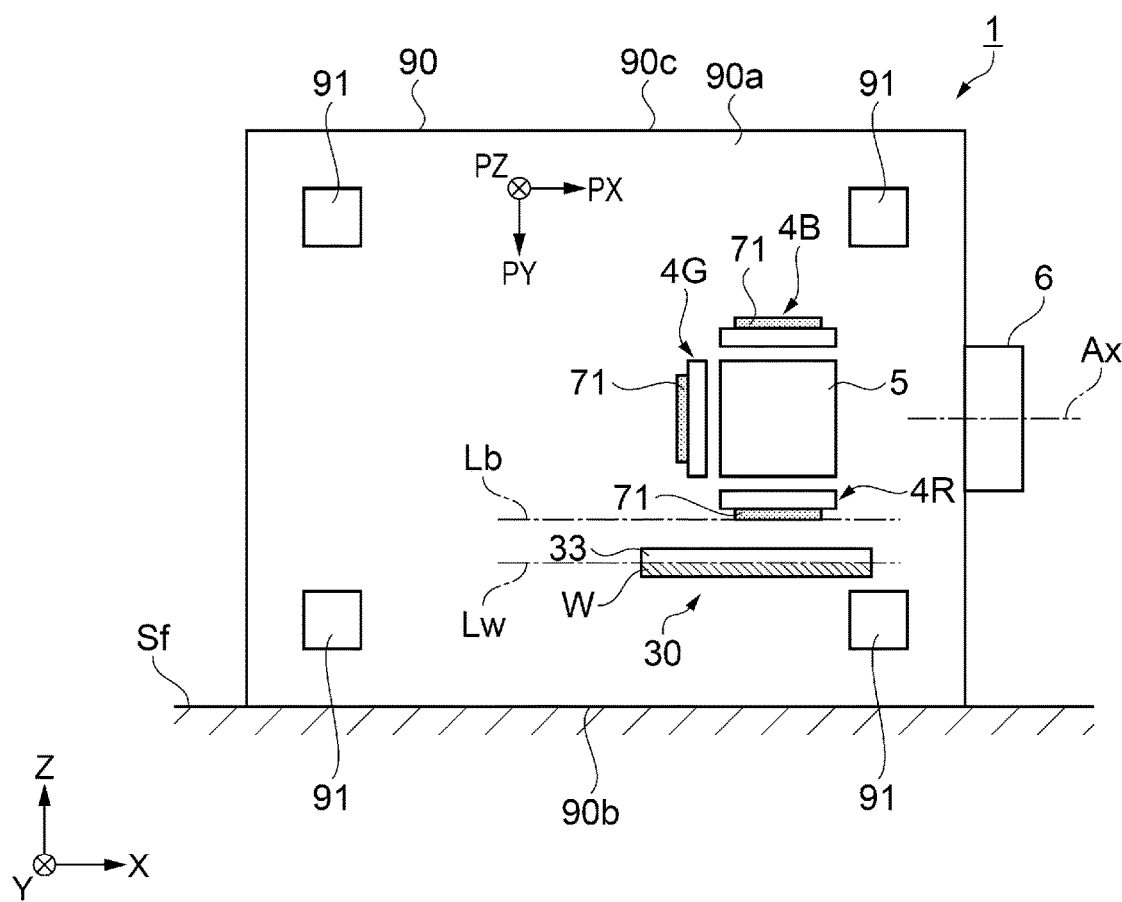
FIG. 14 shows the positional relationship among the heat exchanger, the light modulation units, and the refrigerant holders in the projector according to the first embodiment and also shows the projector in a perpendicular attitude.

In FIG. 14, the attitude of the projector 1 differs from the basic attitude shown in FIG. 10 in that the projector 1 is rotated by 90° around the axis parallel to the horizontal optical axis direction PX counterclockwise when viewed from the negative side in the optical axis direction PX. In FIG. 14, the optical axis direction PX is parallel to the frontward/rearward direction X, the width direction PY is parallel to the gravity direction Z, and the height direction PZ is parallel to the rightward/leftward direction Y. In the attitude shown in FIG. 14, the projector 1 is placed on the floor surface Sf, and a side surface 90b faces the floor surface Sf. In the case where the projector 1 projects a horizontally elongated image (image more elongated in rightward/leftward direction Y than in gravity direction Z) in the basic attitude, the projector 1 projects a vertically elongated image (image more elongated in gravity direction Z than in rightward/leftward direction Y). The attitude in FIG. 14 is also hereinafter called a "perpendicular attitude."

Referring back to FIG. 10, in the basic attitude, the refrigerant W generated in the heat exchanger 30 moves by gravity toward the lower side in the gravity direction. In the basic attitude, since the second lid 33 is located on the lower side in the gravity direction in the heat exchanger 30 as shown in FIG. 10, the generated refrigerant W is stored in the second lid 33. The second lid 33 is so configured that a surface Lw of the stored refrigerant W is lower in the gravity direction than a horizontal plane Lb passing through the lowest portions of the refrigerant holders 71 in the gravity direction.

In the basic attitude shown in FIG. 10, if the surface Lw of the refrigerant W stored in the second lid 33 is higher in the gravity direction than the horizontal plane Lb, it is conceivable that excessive refrigerant W is sent by gravity to the refrigerant holders 71 and leaks therefrom. In contrast, according to the present embodiment, since the surface Lw of the refrigerant W is lower in the gravity direction than the horizontal plane Lb in the basic attitude as shown in FIG. 10, no excessive refrigerant W will be sent.

In the upward projection attitude, since the negative side of the first lid 32 and the second lid 33 in the optical axis direction PX is located on the lower side in the gravity direction in the heat exchanger 30, the generated refrigerant W is stored on the negative side in the first lid 32 and the second lid 33 in the optical axis direction PX, as shown in FIG. 11. The first lid 32 and the second lid 33 are so configured that the surface Lw of the stored refrigerant W is lower in the gravity direction than the horizontal plane Lb passing through the lowest portions of the refrigerant holders 71 in the gravity direction. Therefore, also in the upward projection attitude, no excessive refrigerant W will be sent.

In the inverted attitude, since the first lid 32 is located on the lower side in the gravity direction in the heat exchanger 30, the generated refrigerant W is stored in the first lid 32, as shown in FIG. 12. The first lid 32 is so configured that the surface Lw of the stored refrigerant W is lower in the gravity direction than the horizontal plane Lb passing through the lowest portions of the refrigerant holders 71 in the gravity direction. Therefore, also in the inverted attitude, no excessive refrigerant W will be sent.

In the downward projection attitude, since the positive side of the first lid 32 and the second lid 33 in the optical axis direction PX is located on the lower side in the gravity direction in the heat exchanger 30, the generated refrigerant W is stored on the positive side in the first lid 32 and the second lid 33 in the optical axis direction PX, as shown in FIG. 13. The first lid 32 and the second lid 33 are so configured that the surface Lw of the stored refrigerant W is lower in the gravity direction than the horizontal plane Lb passing through the lowest portions of the refrigerant holders 71 in the gravity direction. Therefore, also in the downward projection attitude, no excessive refrigerant W will be sent.

In the perpendicular attitude, since the positive side of the first lid 32 and the second lid 33 in the width direction PY is located on the lower side in the gravity direction in the heat exchanger 30, the generated refrigerant W is stored on the positive side in the first lid 32 and the second lid 33 in the width direction PY, as shown in FIG. 14. The first lid 32 and the second lid 33 are so configured that the surface Lw of the stored refrigerant W is lower in the gravity direction than the horizontal plane Lb passing through the lowest portions of the refrigerant holders 71 in the gravity direction. Therefore, also in the perpendicular attitude, no excessive refrigerant W will be sent.

In the present embodiment, the basic attitude corresponds to a first attitude. The upward projection attitude, which is the attitude different from the basic attitude in that the projector 1 is rotated by 90° around a horizontal axis parallel to the width direction PY along a first rotational direction, corresponds to a second attitude. In the present embodiment, the first rotational direction is the counterclockwise rotational direction when viewed from the negative side in the width direction PY. The inverted attitude, which is the attitude different from the upward projection attitude in that the projector 1 is further rotated by 90° around the horizontal axis parallel to the width direction PY along the first rotational direction, corresponds to a third attitude. In other words, the inverted attitude, which is the third attitude, differs from the basic attitude, which is the first attitude, in that the projector 1 is rotated by 180° around the horizontal axis parallel to the width direction PY along the first rotational direction.

In the present embodiment, the downward projection attitude, which differs from the inverted attitude in that the projector 1 is further rotated by 90° around the horizontal axis parallel to the width direction PY along the first rotational direction, corresponds to a fourth attitude. The perpendicular attitude, which differs from the basic attitude in that the projector 1 is rotated by 90° around a horizontal axis parallel to the optical axis direction PX, corresponds to a fifth attitude. The horizontal axis parallel to the width direction PY corresponds to a first horizontal axis, and the horizontal axis parallel to the optical axis direction PX corresponds to a second horizontal axis. The optical axis direction PX corresponds to a first direction, and the height direction PZ corresponds to a second direction.

In the present embodiment, in the attitude different from the basic attitude in that the projector 1 is rotated by 90° around the horizontal axis parallel to the optical axis direction PX clockwise when viewed from the negative side in the optical axis direction PX (hereinafter also referred to as "second perpendicular attitude"), the heat exchanger 30 is higher in the gravity direction than the refrigerant holders 71, so that the refrigerant W could be excessively supplied. An instruction manual and other documents therefore instruct the user not to install (use) the projector 1 in the second perpendicular attitude. It is desirable to shape the enclosure 90 in such a way that the projector 1 cannot be stably installed in the second perpendicular attitude, for example, in such a way that aside surface 90c of the enclosure 90, which faces the floor surface Sf in the second perpendicular attitude, is provided with a slope or irregularities.

Second Embodiment

A projector 1 according to a second embodiment will be described below.

The second embodiment differs from the first embodiment in terms of the positional relationship of the heat exchanger 30 with respect to the light modulation units 4R, 4G, and 4B and the refrigerant holders 71 and the attitude of the heat exchanger 30 with respect to the light modulation units 4R, 4G, and 4B and the refrigerant holders 71. Configurations similar to those in the first embodiment, for example, have the same reference characters as appropriate and will not be described in some cases.

Figure 15:
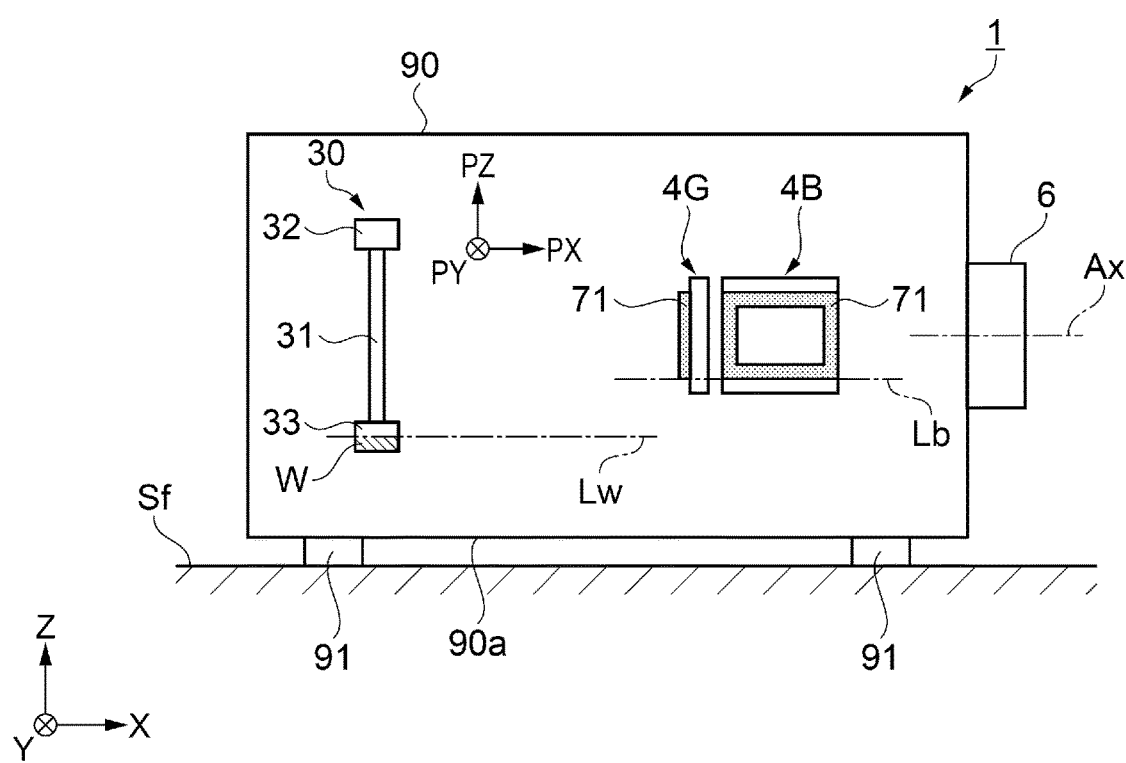
FIG. 15 shows the positional relationship among the heat exchanger, the light modulation units, and the refrigerant holders in a projector according to a second embodiment and also shows the projector in the basic attitude.

FIGS. 15 to 19 are each a perspective view showing the positional relationship among the heat exchanger 30, the light modulation units 4R, 4G, and 4B, and the refrigerant holders 71 in the projector 1 according to the second embodiment. The projector 1 is installed in the basic attitude, which causes the bottom surface 90a of the enclosure 90 to face the floor surface Sf, as shown in FIG. 15. In FIG. 15, the attitude of the projector 1 is so set that the optical axis direction PX is parallel to the frontward/rearward direction X, the width direction PY is parallel to the rightward/leftward direction Y, and the height direction PZ is parallel to the gravity direction Z.

In the present embodiment, the heat exchanger 30 is so disposed that the heat exchanger 30 is located on the negative side of the light modulation units 4R, 4G, and 4B and the refrigerant holders 71 in the optical axis direction PX, and that the flow passage section 31 is perpendicular to the optical axis direction PX. The first lid 32 and the second lid 33 each take an attitude to be parallel to the width direction PY and are so disposed that the first lid 32 is above the second lid 33 in the gravity direction. The heat exchanger 30, the light modulation units 4R, 4G, and 4B, and the refrigerant holders 71 are so disposed that when they are projected on an imaginary plane (first plane) perpendicular to the optical axis direction PX, the heat exchanger 30 extends off the light modulation units 4R, 4G, and 4B and the refrigerant holders 71 on both the positive and negative sides in the width direction PY parallel to the imaginary plane and on both the positive and negative sides in the height direction PZ parallel to the imaginary plane and orthogonal to the width direction PY.

Also in the present embodiment, the attitude of the projector 1 is not limited to the basic attitude shown in FIG. 15, and the projector 1 is installed in any of the attitudes shown in FIGS. 16 to 19 in some cases. FIGS. 16 to 19 show the projector 1 installed in attitudes other than the basic attitude.

Figure 16:
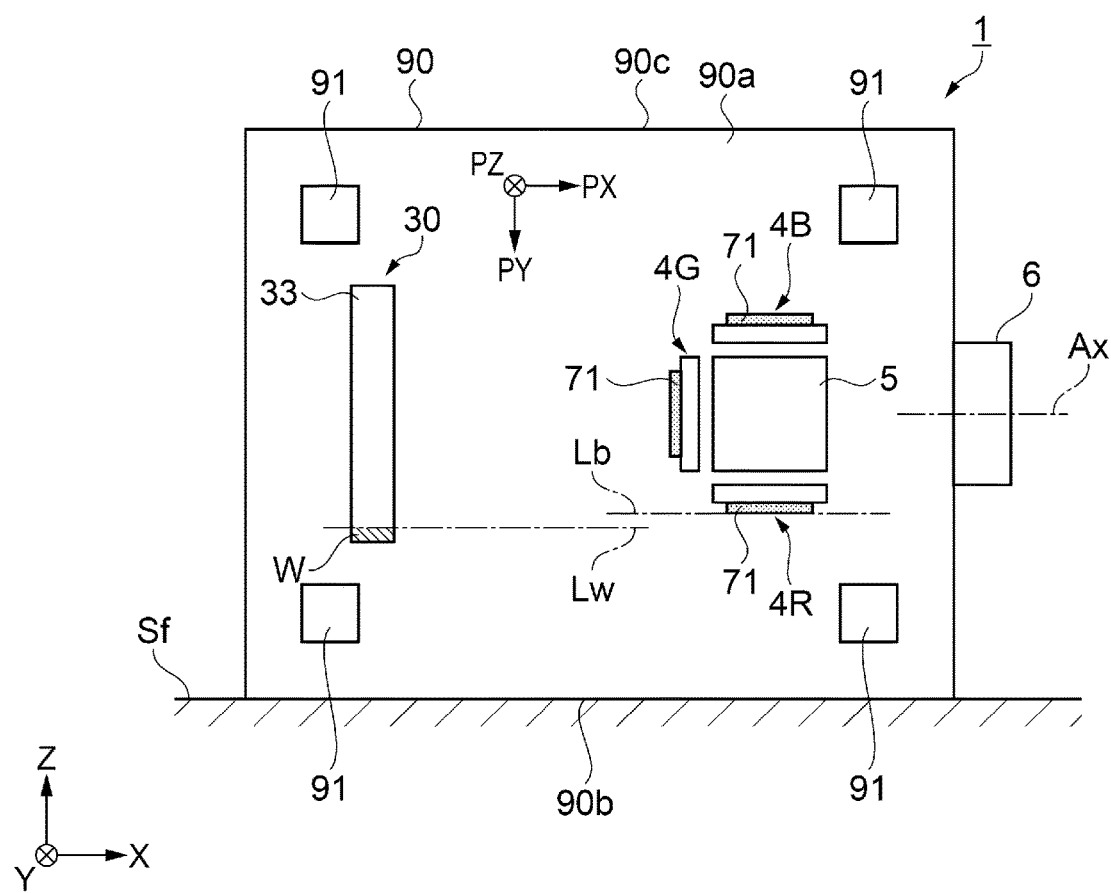
FIG. 16 shows the positional relationship among the heat exchanger, the light modulation units, and the refrigerant holders in the projector according to the second embodiment and also shows the projector in the perpendicular attitude.

In FIG. 16, the projector 1 takes the perpendicular attitude different from the basic attitude shown in FIG. 15 in that the projector 1 is rotated by 90° around the axis parallel to the horizontal optical axis direction PX counterclockwise when viewed from the negative side in the optical axis direction PX. In FIG. 16, the optical axis direction PX is parallel to the frontward/rearward direction X, the width direction PY is parallel to the gravity direction Z, and the height direction PZ is parallel to the rightward/leftward direction Y. In the perpendicular attitude, the projector 1 is placed on the floor surface Sf, and the side surface 90b faces the floor surface Sf.

Figure 17:
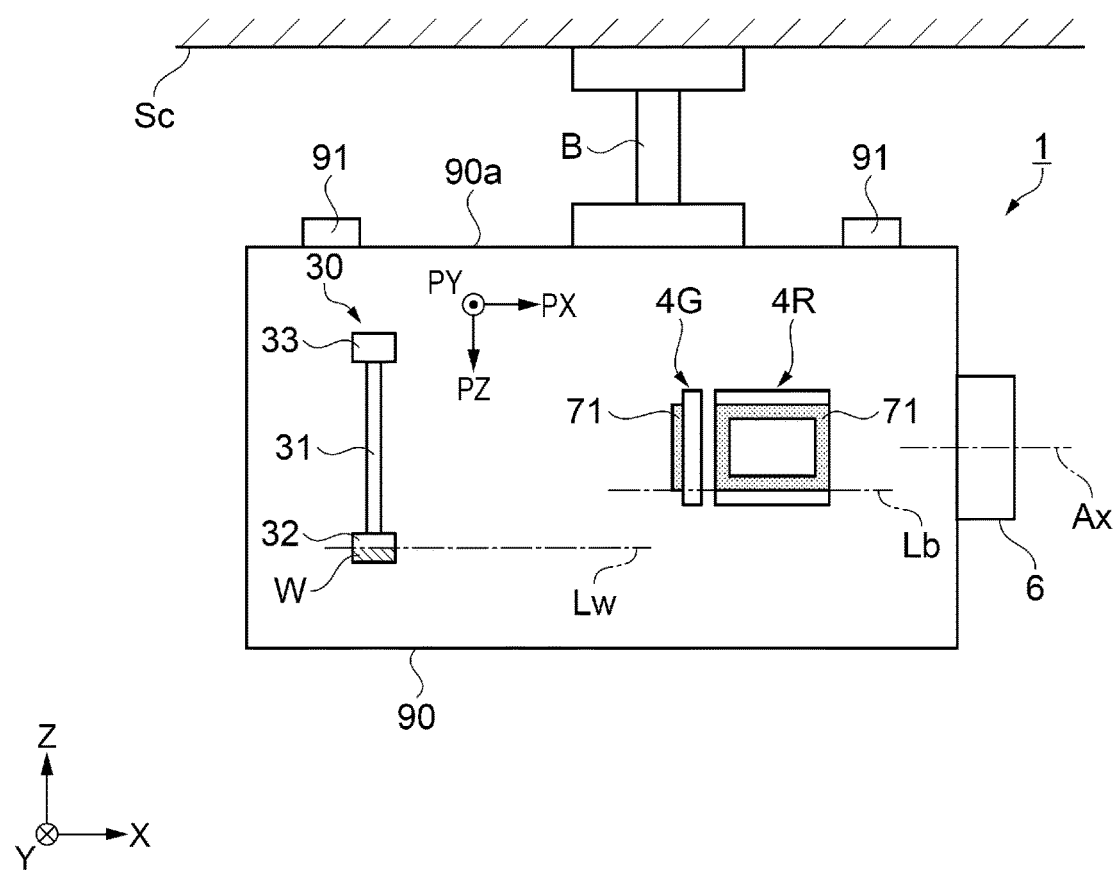
FIG. 17 shows the positional relationship among the heat exchanger, the light modulation units, and the refrigerant holders in the projector according to the second embodiment and also shows the projector in the inverted attitude.

In FIG. 17, the projector 1 takes the inverted attitude different from the basic attitude shown in FIG. 15 in that the projector 1 is rotated by 180° around the axis parallel to the horizontal optical axis direction PX. In other words, the attitude of the projector 1 differs from the perpendicular attitude shown in FIG. 16 in that the projector 1 is rotated by 90° around the axis parallel to the horizontal optical axis direction PX counterclockwise when viewed from the negative side in the optical axis direction PX. In FIG. 17, the optical axis direction PX is parallel to the frontward/rearward direction X, the width direction PY is parallel to the rightward/leftward direction Y, and the height direction PZ is parallel to the gravity direction Z, as in the basic attitude. In the attitude shown in FIG. 17, the fixing member B fixes the projector 1 to the ceiling surface Sc, and the bottom surface 90a of the enclosure 90 faces the ceiling surface Sc.

Figure 18:
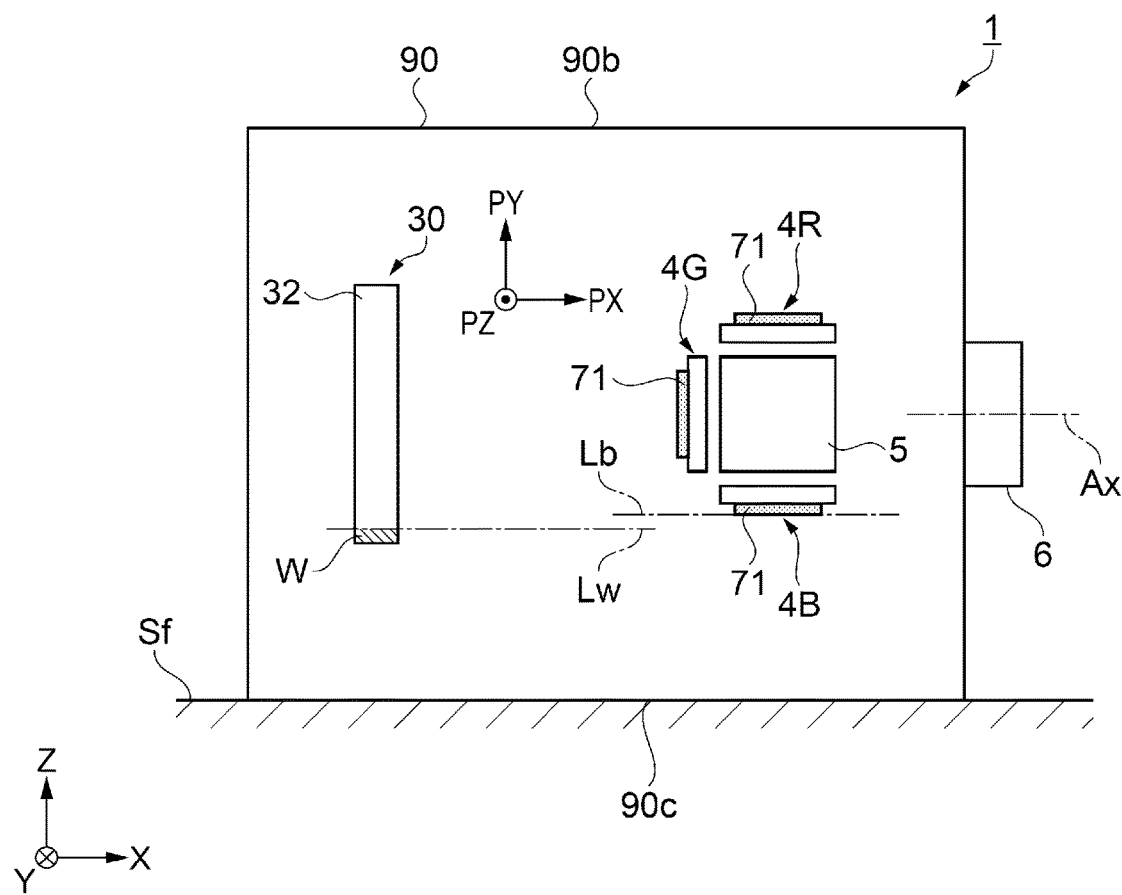
FIG. 18 shows the positional relationship among the heat exchanger, the light modulation units, and the refrigerant holders in the projector according to the second embodiment and also shows the projector in a second perpendicular attitude.

In FIG. 18, the projector 1 takes the second perpendicular attitude different from the basic attitude shown in FIG. 15 in that the projector 1 is rotated by 270° around the axis parallel to the horizontal optical axis direction PX when viewed from the negative side in the optical axis direction PX. In other words, the attitude of the projector 1 differs from the inverted attitude shown in FIG. 17 in that the projector 1 is rotated by 90° around the axis parallel to the horizontal optical axis direction PX counterclockwise when viewed from the negative side in the optical axis direction PX. In FIG. 18, the optical axis direction PX is parallel to the frontward/rearward direction X, the width direction PY is parallel to the gravity direction Z, and the height direction PZ is parallel to the rightward/leftward direction Y, as in the perpendicular attitude. In the second perpendicular attitude, the projector 1 is placed on the floor surface Sf, and the side surface 90c, which is opposite the side surface 90b, faces the floor surface Sf.

Figure 19:
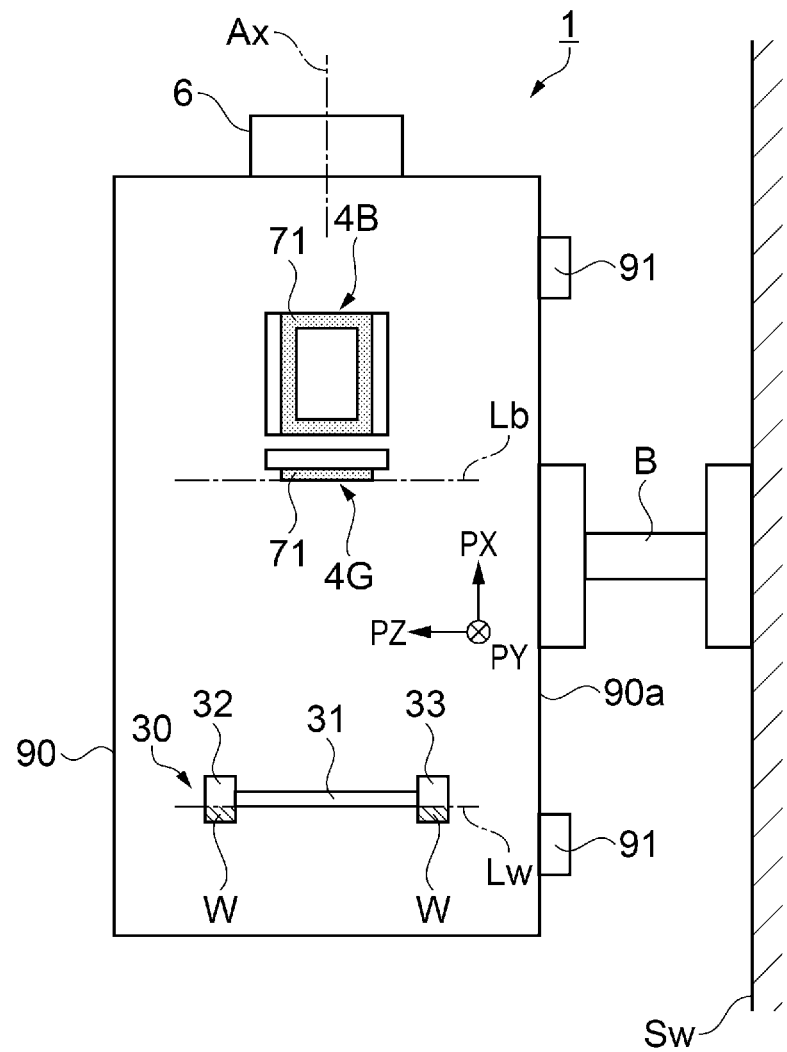
FIG. 19 shows the positional relationship among the heat exchanger, the light modulation units, and the refrigerant holders in the projector according to the second embodiment and also shows the projector in the upward projection attitude.
Figure 20:
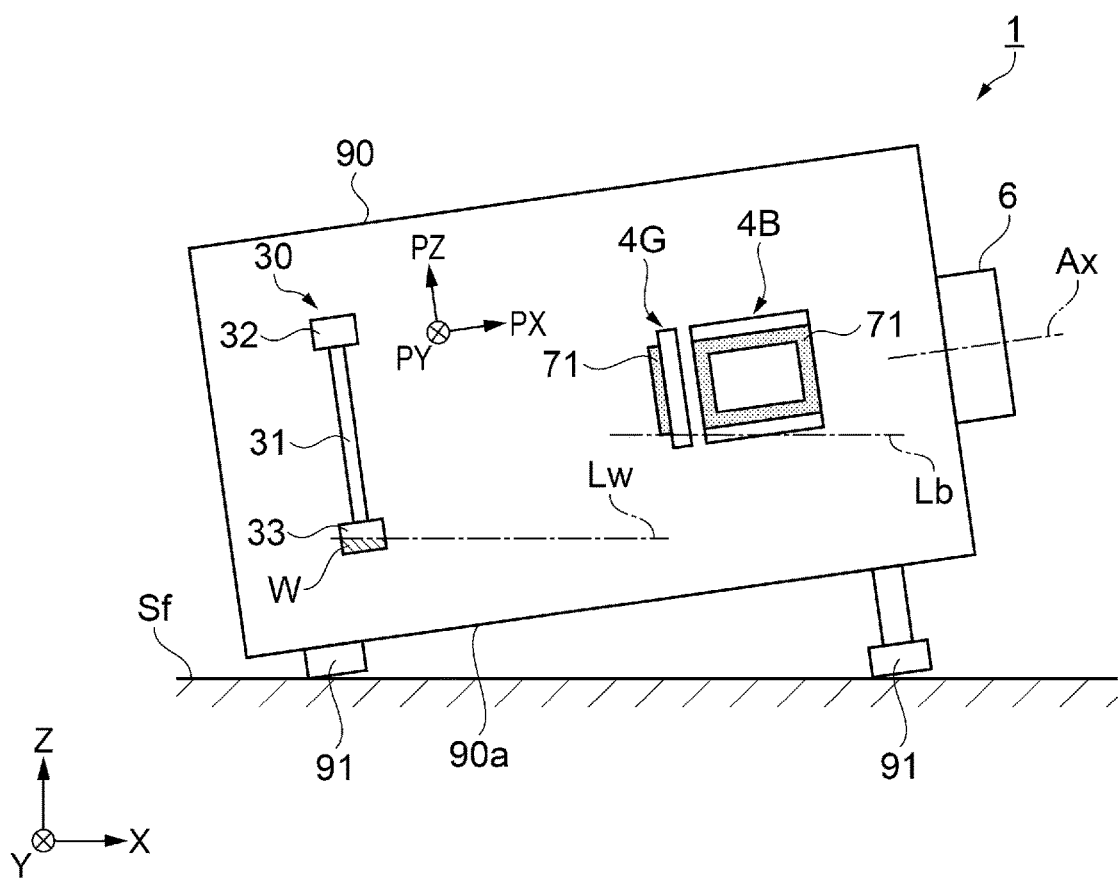
FIG. 20 shows the positional relationship among the heat exchanger, the light modulation units, and the refrigerant holders in a projector according to a variation.

In FIG. 19, the projector 1 takes the upward projection attitude different from the basic attitude shown in FIG. 15 in that the projector 1 is rotated by 90° around the axis parallel to the horizontal width direction PY when viewed from the negative side in the width direction PY. In FIG. 19, the optical axis direction PX is parallel to the gravity direction Z, the width direction PY is parallel to the rightward/leftward direction Y, and the height direction PZ is parallel to the frontward/rearward direction X. In the attitude shown in FIG. 19, the fixing member B fixes the projector 1 to the wall surface Sw, and the bottom surface 90a of the enclosure 90 faces the wall surface Sw.

Referring back to FIG. 15, in the basic attitude, the refrigerant W generated in the heat exchanger 30 moves by gravity toward the lower side in the gravity direction. In the basic attitude, since the second lid 33 is located on the lower side in the gravity direction in the heat exchanger 30 as shown in FIG. 15, the generated refrigerant W is stored in the second lid 33. The second lid 33 is so configured that the surface Lw of the stored refrigerant W is lower in the gravity direction than the horizontal plane Lb passing through the lowest portions of the refrigerant holders 71 in the gravity direction. No excessive refrigerant W will therefore be sent.

In the perpendicular attitude, since the positive side of the first lid 32 and the second lid 33 in the width direction PY is located on the lower side in the gravity direction in the heat exchanger 30, the generated refrigerant W is stored on the positive side in the first lid 32 and the second lid 33 in the width direction PY, as shown in FIG. 16. The first lid 32 and the second lid 33 are so configured that the surface Lw of the stored refrigerant W is lower in the gravity direction than the horizontal plane Lb passing through the lowest portions of the refrigerant holders 71 in the gravity direction. Therefore, also in the perpendicular attitude, no excessive refrigerant W will be sent.

In the inverted attitude, since the first lid 32 is located on the lower side in the gravity direction in the heat exchanger 30, the generated refrigerant W is stored in the first lid 32, as shown in FIG. 17. The first lid 32 is so configured that the surface Lw of the stored refrigerant W is lower in the gravity direction than the horizontal plane Lb passing through the lowest portions of the refrigerant holders 71 in the gravity direction. Therefore, also in the inverted attitude, no excessive refrigerant W will be sent.

In the second perpendicular attitude, since the negative side of the first lid 32 and the second lid 33 in the width direction PY is located on the lower side in the gravity direction in the heat exchanger 30, the generated refrigerant W is stored on the negative side in the first lid 32 and the second lid 33 in the width direction PY, as shown in FIG. 18. The first lid 32 and the second lid 33 are so configured that the surface Lw of the stored refrigerant W is lower in the gravity direction than the horizontal plane Lb passing through the lowest portions of the refrigerant holders 71 in the gravity direction. Therefore, also in the second perpendicular attitude, no excessive refrigerant W will be sent.

In the upward projection attitude, since the negative side of the first lid 32 and the second lid 33 in the optical axis direction PX is located on the lower side in the gravity direction in the heat exchanger 30, the generated refrigerant W is stored on the negative side in the first lid 32 and the second lid 33 in the optical axis direction PX, as shown in FIG. 19. The first lid 32 and the second lid 33 are so configured that the surface Lw of the stored refrigerant W is lower in the gravity direction than the horizontal plane Lb passing through the lowest portions of the refrigerant holders 71 in the gravity direction. Therefore, also in the upward projection attitude, no excessive refrigerant W will be sent.

In the present embodiment, the basic attitude corresponds to the first attitude. The perpendicular attitude, which is the attitude different from the basic attitude in that the projector 1 is rotated by 90° around the horizontal axis parallel to the optical axis direction PX along a first rotational direction, corresponds to the second attitude. In the present embodiment, the first rotational direction is the counterclockwise rotational direction when viewed from the negative side in the optical axis direction PX. The inverted attitude, which is the attitude different from the perpendicular attitude in that the projector 1 is further rotated by 90° around the horizontal axis parallel to the optical axis direction PX along the first rotational direction, corresponds to the third attitude. In other words, the inverted attitude, which is the third attitude, differs from the basic attitude, which is the first attitude, in that the projector 1 is rotated by 180° around the horizontal axis parallel to the optical axis direction PX along the first rotational direction.

In the present embodiment, the second perpendicular attitude, which differs from the inverted attitude in that the projector 1 is further rotated by 90° around the horizontal axis parallel to the optical axis direction PX along the first rotational direction, corresponds to the fourth attitude. The upward projection attitude, which differs from the basic attitude in that the projector 1 is rotated by 90° around the horizontal axis parallel to the width direction PY perpendicular to the optical axis direction PX, corresponds to the fifth attitude. The horizontal axis parallel to the optical axis direction PX corresponds to the first horizontal axis, and the horizontal axis parallel to the width direction PY corresponds to the second horizontal axis. The width direction PY corresponds to the first direction, and the height direction PZ corresponds to the second direction.

In the present embodiment, in the downward projection attitude different from the basic attitude in that the projector 1 is rotated by 90° around the horizontal axis parallel to the width direction PY clockwise when viewed from the negative side in the width direction PY, the heat exchanger 30 is higher in the gravity direction than the refrigerant holders 71, so that the refrigerant W could be excessively supplied. An instruction manual and other documents therefore instruct the user not to install (use) the projector 1 in the downward projection attitude.

Variations

The embodiments described above may be changed as follows.

The above embodiments have been described with reference to the case where the projector 1 is installed in the attitude that causes the optical axis direction PX of the projector 1 to be parallel to the frontward/rearward direction X or the gravity direction Z, but not necessarily. For example, even in a case where projector 1 is installed in an attitude that causes the optical axis direction PX to incline with respect to the frontward/rearward direction X or the gravity direction Z, no excessive refrigerant W will be sent as long as the surface Lw of the stored refrigerant W is lower in the gravity direction than the horizontal plane Lb passing through the lowest portions of the refrigerant holders 71 in the gravity direction.

In the first embodiment described above, out of the six attitudes, the basic attitude, the upward projection attitude, the inverted attitude, the downward projection attitude, the perpendicular attitude, and the second perpendicular attitude, no excessive refrigerant W will be sent in the five attitudes excluding the second perpendicular attitude. In the second embodiment, no excessive refrigerant W will be sent in the five attitudes excluding the downward projection attitude. As described above, the attitudes that prevent excessive refrigerant W from being sent can be selected as appropriate in accordance with the arrangement and attitude of the heat exchanger 30. Five out of the six attitudes described above do not necessarily prevent excessive refrigerant W from being sent, and only two to four attitudes can prevent excessive refrigerant W from being sent.

The configuration of the flow passage section 31 is not limited to the configuration in the embodiments described above. The flow passage section 31 does not necessarily have a specific configuration as long as the refrigerant W flows through the flow passage section 31. The flow passage section 31 may, for example, have a box-like shape or a polygonal tubular shape. Still instead, the flow passage section 31 may be formed of one pipe. The attitude of the flow passage section 31 is not limited to the attitude in the embodiments described above.

The configuration of the enclosure 90 is not limited to the configuration in the embodiments described above. The enclosure 90 does not necessarily have a specific shape. The surfaces that form the enclosure 90 may not be orthogonal to each other and may instead each be a curved surface.

The configuration of the refrigerant generator 20 is not limited to the configuration in the embodiments described above. The refrigerant generator 20 does not necessarily have a specific configuration and may have any configuration that allows generation of the refrigerant W. For example, the refrigerant generator 20 may use a thermoelectric device to condense water vapor in the air in the projector 1 to generate the refrigerant W. Instead, for example, the refrigerant generator 20 may include a fuel cell, such as a hydrogen cell. In this case, for example, water generated by the fuel cell when electric power is supplied to the projector 1 can be used as the refrigerant W. The refrigerant W is not limited to a specific medium and may be any non-water medium capable of cooling the cooling target. The refrigerant W to be generated is not limited to a liquid and may, for example, be a solid. In this case, the solid refrigerant may change to a liquid while the refrigerant is sent to the cooling target or may be sent in the form of the solid to the cooling target. In the case where the refrigerant W is sent in the form of the solid to the cooling target, the refrigerant W may be sublimated directly into a gas to cool the cooling target or may be melted and changed to a liquid, which may then vaporize to cool the cooling target.

The configuration of each of the first catcher 51, the second catcher 52, and the third catchers 53 is not limited to the configuration in the embodiments described above. The first catcher 51, the second catcher 52, and the third catchers 53 each do not necessarily have a specific configuration and may have any configuration that allows the refrigerant W in the heat exchanger 30 to be sent to the refrigerant sender 50. The first catcher 51, the second catcher 52, and the third catchers 53 may each provide surface tension with the aid of grooves directly formed in the inner wall of the heat exchanger 30 instead of including a porous member.

The configuration of the refrigerant sender 50 is not limited to the configuration in the embodiments described above. The refrigerant sender 50 does not necessarily have a specific configuration and may have any configuration that can send the refrigerant W to the cooling target. The refrigerant sender 50 may include a pump that sends the refrigerant W and a pipe through which the refrigerant W sent by the pump passes. The refrigerant sender 50 may still instead send the refrigerant to the cooling target, for example, by using gravity.

The configuration of the cooling facilitators 70 is not limited to the configuration in the embodiments described above. The cooling facilitators 70 do not necessarily have a specific configuration and may have any configuration that can facilitate the cooling of the cooling target performed by the refrigerant W sent to the cooling target. For example, the refrigerant holder 71 of each of the cooling facilitators 70 may be minute protruding portions and recessed portions formed in the surface of the cooling target, for example, by processing the surface. In this case, the protruding portions and the recessed portions hold the refrigerant W. Still instead, the refrigerant holders 71 may, for example, each be a hydrophilic coating provided on the surface of the cooling target.

The heater 22 does not necessarily have the configuration described above. The heater 22 may have a configuration in which the heater 22 comes into contact with the moisture absorbing/discharging member 40 to heat the moisture absorbing/discharging member 40. In this case, the heater 22 may not heat the air before passing through the moisture absorbing/discharging member 40.

The cooling target in the embodiments described above is the light modulation units 4R, 4G, and 4B, but not necessarily. The cooling target may include at least one of the light modulators 4RP, 4GP, and 4BP, the light modulation units 4R, 4G, and 4B, the light source apparatus 2, a wavelength conversion element that converts the wavelength of the light outputted from the light source apparatus 2, a diffuser element that diffuses the light outputted from the light source apparatus 2, and a polarization conversion element that converts the polarization direction of the light outputted from the light source apparatus 2. According to the configuration described above, the portions of the projector 1 can be cooled in the same manner described above.

In the embodiments described above, the description has been made with reference to the case where the invention is applied to the transmission-type projector 1, and the invention is also applicable to a reflection-type projector 1. The term "transmission-type" means that the light modulators 4RP, 4GP, and 4BP each including a liquid crystal panel or any other component are of light transmissive type. The term "reflection-type" means that the light modulators 4RP, 4GP, and 4BP are of light reflective type. The light modulators 4RP, 4GP, and 4BP are each not limited, for example, to a liquid crystal panel and may, for example, be a light modulator using a micromirror.

In the embodiments described above, the projector 1 using the three light modulators 4RP, 4GP, and 4BP has been presented by way of example. The invention is also applicable to a projector 1 using only one light modulator and a projector 1 using four or more light modulators.

The configurations described above can be combined with one another to the extent that the combination causes no contradiction.

The entire disclosure of Japanese Patent Application No. 2018-036219, filed Mar. 1, 2018 is expressly incorporated by reference herein.

What is claimed is:
1. A projector comprising:
a light source apparatus that emits light;
a light modulator that modulates the light emitted from the light source apparatus in accordance with an image signal;
a projection optical apparatus that projects the light modulated by the light modulator; and
a cooler that cools a cooling target based on transformation of a refrigerant into a gas, wherein:
the cooler includes
a refrigerant generator that generates the refrigerant,
a refrigerant sender that sends the refrigerant generated in the refrigerant generator toward the cooling target, and
a refrigerant holder connected to the cooling target, the refrigerant holder holding the refrigerant sent by the refrigerant sender and receiving heat from the cooling target to transform the refrigerant into a gas,
the refrigerant generator includes a storage that stores the generated refrigerant therein, and
in a case where the projector takes a first attitude, the refrigerant holder and the refrigerant generator are so located in the projector that a surface of the refrigerant stored in the storage is lower in a gravity direction than a lowest portion of the refrigerant holder in the gravity direction.
2. The projector according to claim 1,
wherein the refrigerant holder and the refrigerant generator are so located in the projector that the surface of the refrigerant stored in the storage is lower in the gravity direction than the lowest portion of the refrigerant holder in the gravity direction both in the first attitude and a second attitude that the projector taking the first attitude is rotated by 90° around a first horizontal axis.
3. The projector according to claim 1,
wherein the refrigerant holder and the refrigerant generator are so located in the projector that the surface of the refrigerant stored in the storage is lower in the gravity direction than the lowest portion of the refrigerant holder in the gravity direction both in the first attitude and a second attitude that the projector taking the first attitude is rotated by 180° around a first horizontal axis.

4. The projector according to claim 1,
wherein the refrigerant holder and the refrigerant generator are so located in the projector that the surface of the refrigerant stored in the storage is lower in the gravity direction than the lowest portion of the refrigerant holder in the gravity direction in:
the first attitude,
a second attitude that the projector taking the first attitude is rotated by 90° around a first horizontal axis along a first rotational direction,
a third attitude that the projector taking the second attitude is further rotated by 90° around the first horizontal axis along the first rotational direction, and
a fourth attitude that the projector taking the third attitude is further rotated by 90° around the first horizontal axis along the first rotational direction.

5. The projector according to claim 4,
wherein the refrigerant holder and the refrigerant generator are so located in the projector that the surface of the refrigerant stored in the storage is lower in the gravity direction than the lowest portion of the refrigerant holder in the gravity direction in a fifth attitude different that the projector taking the first attitude is rotated by 90° around a second horizontal axis orthogonal to the first horizontal axis.

6. The projector according to claim 1,
wherein the refrigerant holder and the refrigerant generator are so located in the projector that when the storage and the refrigerant holder are projected on a first plane perpendicular to the first horizontal direction, the storage extends off the refrigerant holder on both positive and negative sides in a first direction parallel to the first plane and on both positive and negative sides in a second direction parallel to the first plane and orthogonal to the first direction.

7. The projector according to claim 1,
wherein a groove that causes surface tension to occur is formed in an inner wall of the storage, and
wherein the refrigerant sender includes the groove.

8. The projector according to claim 1,
wherein an inner wall of the storage is provided with a porous member, and
wherein the refrigerant sender includes the porous member.

9. The projector according to claim 1,
wherein the cooling target is the light modulator.

* * * * *